(12) United States Patent  
Miyazawa et al.

(10) Patent No.: US 11,386,549 B2  
(45) Date of Patent: Jul. 12, 2022

(54) ABNORMALITY INSPECTION DEVICE AND ABNORMALITY INSPECTION METHOD

(71) Applicant: Mitsubishi Electric Corporation, Tokyo (JP)

(72) Inventors: Kazuyuki Miyazawa, Tokyo (JP); Kazuo Sugimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 124 days.

(21) Appl. No.: 17/031,004

(22) Filed: Sep. 24, 2020

(65) Prior Publication Data

US 2021/0012476 A1    Jan. 14, 2021

Related U.S. Application Data

(63) Continuation of application No. PCT/JP2018/013305, filed on Mar. 29, 2018.

(51) Int. Cl.
*G06K 9/00* (2022.01)
*G06T 7/00* (2017.01)

(52) U.S. Cl.
CPC .... *G06T 7/001* (2013.01); *G06T 2207/20081* (2013.01); *G06T 2207/20084* (2013.01); *G06T 2207/20224* (2013.01)

(58) Field of Classification Search
CPC .......... G06T 7/001; G06T 2207/20081; G06T 2207/20084; G06T 2207/20224;

(Continued)

(56) References Cited

U.S. PATENT DOCUMENTS

2013/0202202 A1*   8/2013   Hasu ................... G06T 3/4053
                                                        382/166
2020/0099876 A1*   3/2020   Shimada ............... H04N 5/374
(Continued)

FOREIGN PATENT DOCUMENTS

JP            6-281592 A      10/1994
JP          2013-32995 A       2/2013
JP            6241576 B1      12/2017

OTHER PUBLICATIONS

International Search Report issued in PCT/JP2018/013305 (PCT/ISA/210), dated Jun. 12, 2018.

(Continued)

*Primary Examiner* — Samir A Ahmed
(74) *Attorney, Agent, or Firm* — Birch, Stewart, Kolasch & Birch, LLP

(57) ABSTRACT

Included are: an image acquiring unit acquiring a determination target image in which a target object to be inspected is captured; a learning result acquiring unit acquiring a result of machine learning of forward domain conversion of an image or inverse domain conversion of an image performed using a normal image in which the target object in a normal state is captured as training data; a determination target image analysis unit obtaining a domain-converted image by sequentially performing forward domain conversion and inverse domain conversion on the determination target image using the result of the machine learning; and a determination unit determining whether or not an abnormality is occurring in the target object captured in the determination target image by comparing the determination target image and the domain-converted image.

6 Claims, 16 Drawing Sheets

Photograph Domain
(Determination Target Image)

Forward Conversion

Area Domain
(Forward-Domain-Converted Image)

Inverse Conversion

Photograph Domain
(Domain-Converted Image)

(58) Field of Classification Search
CPC ........ G06T 2207/30141; G06T 7/0002; G01N 21/88; G01N 21/8851; G01N 2021/8887; G06N 20/00
See application file for complete search history.

(56) References Cited

U.S. PATENT DOCUMENTS

| | | |
|---|---|---|
| 2020/0240927 A1* | 7/2020 | Liu ........................ G06T 7/0002 |
| 2021/0227152 A1* | 7/2021 | Zhang ................ H04N 5/23222 |
| 2021/0295485 A1 | 9/2021 | Miyazawa |

OTHER PUBLICATIONS

Isola et al., "Image-to-Image Translation with Conditional Adversarial Networks", Conference on Computer Vision and Pattern Recognition, 2017, pp. 1-17.
Otsu, "A Threshold Selection Method from Gray-Level Histograms", IEEE Transactions On Systems, Man, and Cybernetics, vol. Smc-9, No. 1, Jan. 1979, pp. 62-66.
German Office Action for German Application No. 112018007171.5, dated Sep. 17, 2021, with an English translation.

* cited by examiner

Result of Threshold Value Process

Determination Target Image

Two-Dimensional Mask

ABNORMALITY INSPECTION DEVICE AND ABNORMALITY INSPECTION METHOD

CROSS REFERENCE TO RELATED APPLICATIONS

This application is a Continuation of PCT International Application No. PCT/JP2018/013305, filed on Mar. 29, 2018, which is hereby expressly incorporated by reference into the present application.

TECHNICAL FIELD

The present invention relates to an abnormality inspection device and an abnormality inspection method for inspecting whether or not an abnormality is occurring in an object.

BACKGROUND ART

Technology for automatically inspecting whether or not an object has an abnormality by a machine through analysis of an image obtained by imaging the object with a camera or the like is important for, for example, automation or labor saving of appearance inspection that is visually performed during a manufacturing process of industrial products.

For example, Patent Literature 1 discloses an inspection device for determining, for each pixel, whether or not characteristics belong to a set good pixel range for a digital image acquired from a target object to be inspected by generating a set good pixel range by calculating a statistic of characteristics for each pixel having the same coordinate values for digital images individually acquired from a predetermined number of objects out of multiple objects of the same specification.

CITATION LIST

Patent Literatures

Patent Literature 1: JP 2013-32995 A

SUMMARY OF INVENTION

Technical Problem

In the prior art represented by the technology disclosed in Patent Literature 1, it is necessary that the positional relationship between a target object and a camera always be constant when the object is imaged. It is further required that all images be aligned with high accuracy. Therefore, there is a disadvantage that abnormality determination is affected by a difference in imaging conditions or a difference between images due to variations within a normal range.

The present invention has been made to solve the disadvantage as described above, and an object of the present invention is to provide an abnormality inspection device and an abnormality inspection method capable of inspecting an abnormality of a target object without being affected by a difference in imaging conditions or a difference between images due to variations within a normal range.

Solution to Problem

An abnormality inspection device according to the present invention includes: processing circuitry: to acquire a determination target image in which a target object to be inspected is captured; to acquire a result of machine learning of forward domain conversion of an image or inverse domain conversion of an image performed using a normal image in which the target object in a normal state is captured as training data; to obtain a domain-converted image by sequentially performing forward domain conversion and inverse domain conversion on the determination target image, using the result of the machine learning; to determine whether or not an abnormality is occurring in the target object captured in the determination target image by comparing the determination target image and the domain-converted image; to obtain a forward-domain-converted image by performing forward domain conversion on the determination target image using a result of machine learning performed using the normal image as training data; and to perform analysis on the abnormality using the forward-domain-converted image when the abnormality is determined to be occurring in the target object captured in the determination target image.

Advantageous Effects of Invention

According to the present invention, it is possible to inspect an abnormality of a target object without being affected by a difference in imaging conditions or a difference between images due to variations within a normal range.

BRIEF DESCRIPTION OF DRAWINGS

FIG. 10B is a diagram illustrating an image of the two-dimensional mask, and FIG. 10A is a diagram illustrating an image obtained by superimposing the two-dimensional mask illustrated in FIG. 10B over a determination target image.

DESCRIPTION OF EMBODIMENTS

Hereinafter, embodiments of the present invention will be described in detail with reference to the drawings.

First Embodiment

In the following description, an object to be inspected, which is captured in a determination target image (details will be described later) that is an object for which an abnormality inspection device 1 according to the first embodiment determines its abnormality, is referred to as a "target object." A target object may be any object that can be at least visually inspected, such as a circuit board or wiring.

Figure 1:
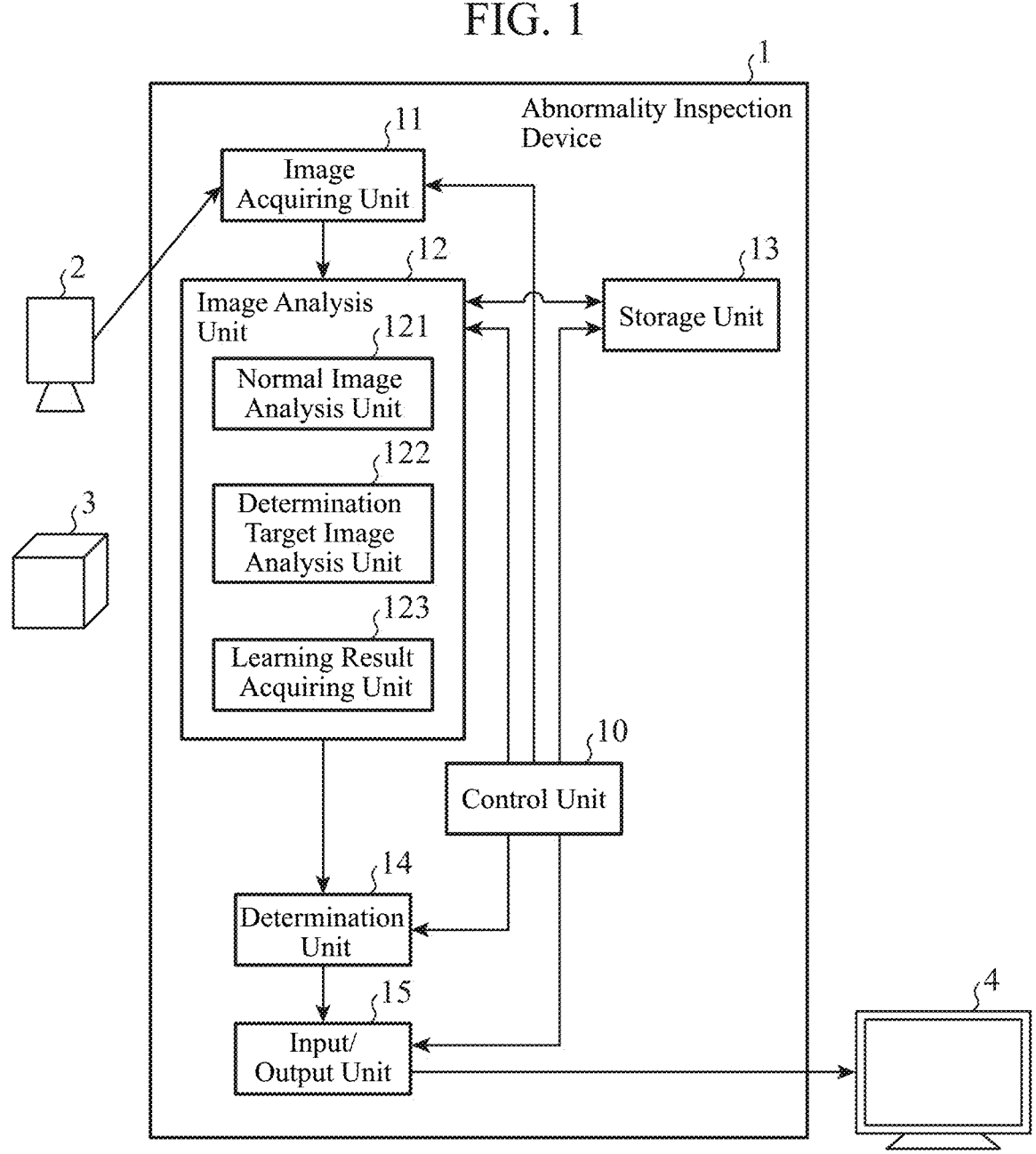
FIG. 1 is a diagram illustrating a configuration example of an abnormality inspection device according to a first embodiment.

FIG. 1 is a diagram illustrating a configuration example of the abnormality inspection device 1 according to the first embodiment.

The abnormality inspection device 1 is connected to a camera 2 and an input/output device 4 via a network, for example.

The abnormality inspection device 1 acquires an image capturing a target object 3 from the camera 2, determines whether or not an abnormality is occurring in the target object, and outputs the determination result to the input/output device 4. Hereinafter, an image capturing the target object 3 is referred to as a "captured image."

The input/output device 4 includes, for example, a display, a speaker, a keyboard, a mouse, or the like.

Note that, in the first embodiment, the abnormality inspection device 1 is connected to the camera 2 and the input/output device 4 via the network as illustrated in FIG. 1; however, this is merely an example, and the abnormality inspection device 1 may include the camera 2 and the input/output device 4.

The abnormality inspection device 1 includes a control unit 10, an image acquiring unit 11, an image analysis unit 12, a storage unit 13, a determination unit 14, and the input/output unit 15.

The image analysis unit 12 includes a normal image analysis unit 121, a determination target image analysis unit 122, and a learning result acquiring unit 123.

The control unit 10 controls the operation of the image acquiring unit 11, the image analysis unit 12, the determination unit 14, and the input/output unit 15.

The image acquiring unit 11 acquires a captured image from the camera 2 via the network.

The timing at which the image acquiring unit 11 receives the captured image from the camera 2 may be determined in advance such as 30 times per second, or may be determined on the basis of an instruction from the control unit 10. Here, it is assumed that the captured image acquired by the image acquiring unit 11 is digitalized; however, it is not limited thereto.

The image acquiring unit 11 outputs the acquired captured image to the image analysis unit 12.

The image analysis unit 12 performs processes that correspond to two operation modes.

In the first embodiment, the abnormality inspection device 1 performs two operation modes. The two operation modes performed by the abnormality inspection device 1 are referred to as a "learning mode" and an "inspection mode," respectively.

In the "learning mode," the abnormality inspection device 1 learns how to perform domain conversion in a normal state of the target object 3 by machine learning on the basis of one or more captured images capturing the target object 3 in a normal state without abnormalities. The domain conversion will be described later.

Hereinafter, among captured images, a captured image capturing the target object 3 in a normal state without abnormalities is referred to as a "normal image."

In addition, the abnormality inspection device 1 determines, in the "inspection mode," whether or not an abnormality is occurring in the target object 3 captured in the captured image on the basis of the captured image capturing the target object 3. Hereinafter, among captured images, a captured image to be determined whether an abnormality is occurring is referred to as a "determination target image."

In the abnormality inspection device 1, the "inspection mode" is performed after the operation of the "learning mode" is completed.

In the "learning mode," it is assumed that the target object 3 is in a normal state without abnormalities. Accordingly, all the captured images acquired by the image acquiring unit 11 in the "learning mode" are normal images.

If objects are of the same type, the abnormality inspection device 1 may set multiple different objects as target objects, and may acquire a normal image capturing the multiple different target objects 3 in a normal state from the camera 2 to learn a normal state of the target objects 3.

Note that in the "learning mode" the camera 2 acquires an image of another domain that corresponds to the normal image for machine learning in addition to the normal image. Details of the image of the other domain will be described later.

The normal image analysis unit 121 of the image analysis unit 12 performs processes that correspond to the "learning mode," and the determination target image analysis unit 122 and the learning result acquiring unit 123 of the image analysis unit 12 perform processes that correspond to the "inspection mode."

In the "learning mode," the normal image analysis unit 121 of the image analysis unit 12 acquires a specified number (for example, 1000 pieces) of normal images from the image acquiring unit 11, and performs a domain conversion learning process on the basis of the acquired normal images.

The domain conversion learning is machine learning by which how to perform domain conversion when the target object 3 is in a normal state is learned.

The number of normal images used when the normal image analysis unit 121 performs domain conversion learning may be specified in advance or may be specified from the control unit 10.

Specifically, for example in a case where the number of normal images is specified in advance, the normal image analysis unit 121 terminates acquisition of the normal image when the number of normal images acquired from the image acquiring unit 11 has reached the number specified in advance.

Alternatively, for example in a case where the number of normal images is based on an instruction from the control unit 10, the normal image analysis unit 121 continues receiving normal images output from the image acquiring unit 11 until an image acquisition end instruction is output from the control unit 10. When the image acquisition end instruction is output from the control unit 10, the normal image analysis unit 121 ends the acquisition of normal images. The control unit 10 prompts the image acquisition end instruction from a user. Specifically, for example, the user inputs the image acquisition end instruction from the input/output device 4. The control unit 10 accepts the image acquisition end instruction input thereto, and outputs the image acquisition end instruction to the normal image analysis unit 121.

Here, domain conversion of an image will be described.

Figure 2:
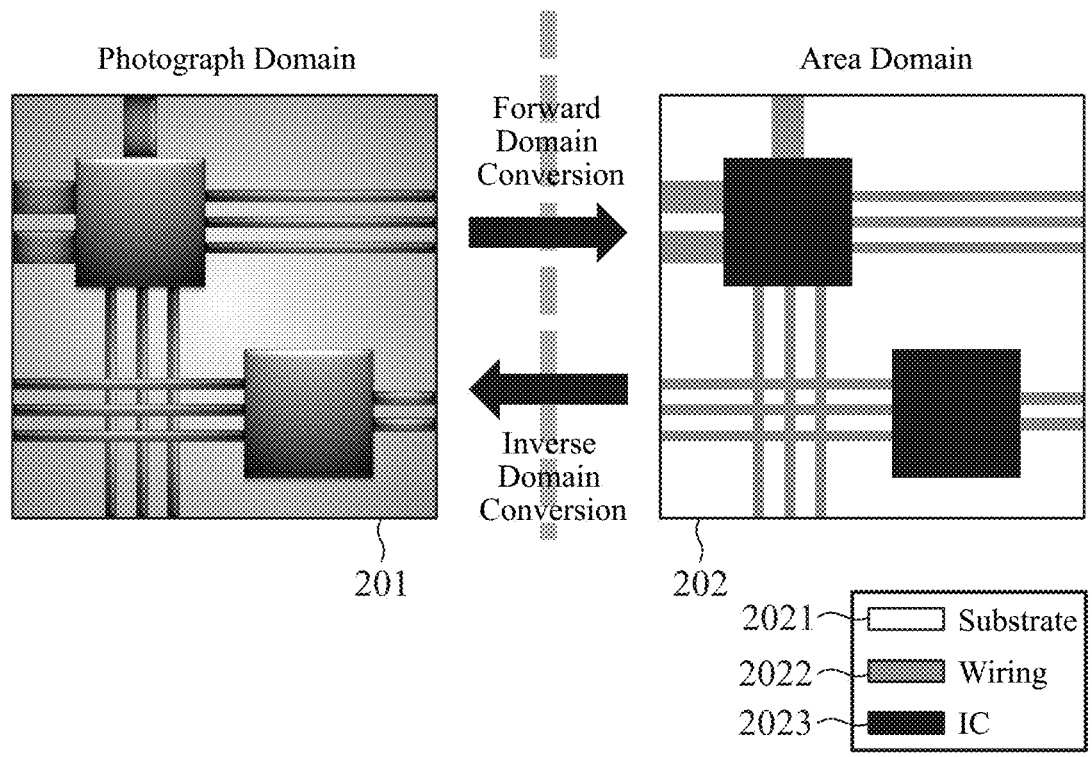
FIG. 2 is a diagram for explaining domain conversion of an image.

FIG. 2 is a diagram for explaining domain conversion of an image.

A domain of an image refers to a type of the image, and domain conversion of an image is to convert an image of a certain domain into an image of a domain that is different from that certain domain.

Illustrated in FIG. 2 as exemplary domains include an image obtained by imaging a circuit board with a general camera (an image of a photograph domain, see 201 in FIG. 2) and an image of an area domain in which parts on the circuit board are separated (see 202 in FIG. 2). In the first embodiment, captured images that the image acquiring unit 11 acquires from the camera 2 are images of the photograph domain.

In the exemplary image of the area domain in FIG. 2, a substrate area (see 2021 in FIG. 2) on the circuit board, a wiring area (see 2022 in FIG. 2), and an IC area (see 2023 in FIG. 2) are illustrated.

In domain conversion, it is also possible to convert an image of the photograph domain to obtain an image of the area domain, and then to convert the image of the area domain again to obtain an image of the photograph domain.

As illustrated in FIG. 2, for example, the domain conversion from the image of the photograph domain to the image of the area domain is referred to as "forward domain conversion," and domain conversion from the image of the area domain to the image of the photograph domain is referred to as "inverse domain conversion."

Note that the image of the photograph domain and the image of the area domain have been described in FIG. 2; however, a domain of an image may vary.

Figure 3:
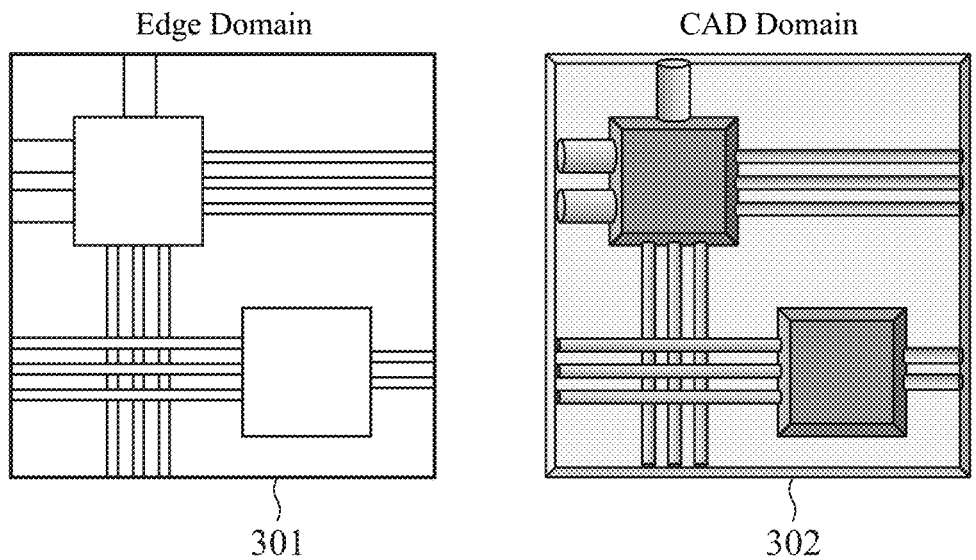
FIG. 3 is a diagram illustrating exemplary images of domains other than a photograph domain and an area domain.

FIG. 3 is a diagram illustrating exemplary images of domains other than the photograph domain and the area domain.

An image of an edge domain illustrated in FIG. 3 (see 301 in FIG. 3) is obtained by extracting only the edges from the image of the photograph domain. Meanwhile, an image of a computer aided design (CAD) domain (see 302 in FIG. 3) illustrated in FIG. 3 is drawn by CAD software.

It is known that domain conversion of an image as described above can be executed with high accuracy by machine learning using a neural network (e.g. see Non-Patent Literature 1).

Non-Patent Literature 1: Phillip Isola, Jun-Yan Zhu, Tinghui Zhou, and Alexei A. Efros, "Image-to-Image Translation with Conditional Adversarial Nets," Conference on Computer Vision and Pattern Recognition (2017).

Figure 4:
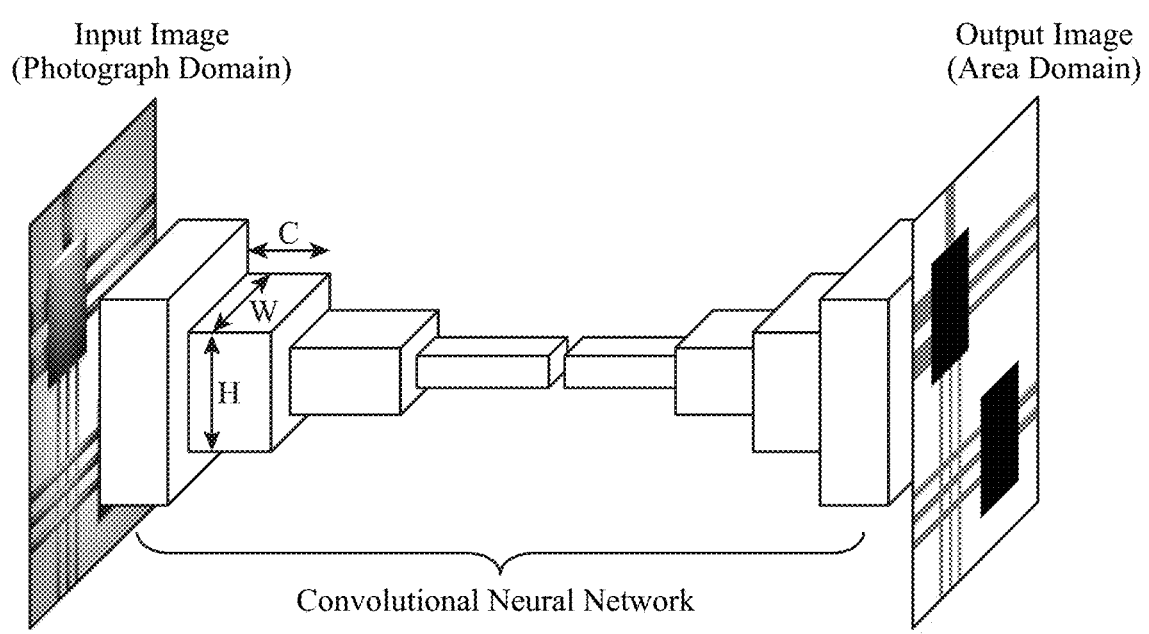
FIG. 4 is a diagram illustrating how domain conversion of an image is performed using a neural network.

FIG. 4 is a diagram illustrating how domain conversion of an image is performed using a neural network.

In FIG. 4, an example is illustrated in which domain conversion of an image is performed between the image in the photograph domain and the image in the area domain using the neural network.

In FIG. 4, a convolutional neural network, which is known to exhibit a particularly high effect on image processing among neural networks, is used to perform the domain conversion of the image.

The convolutional neural network is a type of neural network, in which a large number of filters are repeatedly convoluted in an input image, and the number of dimensions in the spatial direction or the number of channels are varied to finally obtain a desired result.

In FIG. 4, as an example, the lateral length of a filter is denoted by W, the height by H, and the number of channels by C.

A configuration of the neural network can vary. In the example of the neural network used for domain conversion illustrated in FIG. 4, first, the number of channels is increased while convolution is repeated and the number of dimensions in the spatial direction is reduced, and then the number of dimensions in the spatial direction is increased while the number of channels is reduced. By this conversion, an output image having the number of dimensions and the number of channels that match the number of dimensions and the number of channels of the input image is finally obtained.

Note that the state of domain conversion illustrated in FIG. 4 is merely an example, and domain conversion is not limited to that performed using a neural network.

Moreover, in a case where a neural network is used for domain conversion, the neural network used is not limited to a convolutional neural network. As a neural network used for domain conversion, for example, any neural network can be used such as a fully-connected neural network or a neural network in which a convolutional neural network and a fully-connected neural network are combined.

The normal image analysis unit 121 acquires, for each of one or more normal images used for domain conversion learning, an image of another domain corresponding thereto, and causes the neural network to perform learning for forward domain conversion and inverse domain conversion. Since a normal image is an image in the photograph domain, the image in the other domain is an image in a domain other than the photograph domain. In the example of FIG. 4, the image of the other domain is the image of the area domain.

The normal image analysis unit 121 uses normal images and images of other domains as training data to cause the neural network to perform learning for forward domain conversion from a normal image, which is an image of the photograph domain, to an image of the area domain, and inverse domain conversion from an image of the area domain to a normal image.

Here, learning by the neural network is to optimize weights at each edge of the network so that a desired result can be obtained for the learning data, and is to optimize filter coefficients in a case of a convolutional neural network. In forward domain conversion, learning is performed so that a result of conversion of an input normal image gets closer to the corresponding image of the area domain, and in reverse conversion, learning is performed so that a result of conversion of an input image of the area domain gets closer to the corresponding normal image. Note that the neural network for forward conversion and the neural network for reverse conversion may have the identical configuration or different configurations.

Note that the normal image analysis unit 121 can acquire the corresponding image of another domain by a filter process or the like on the image. For example in a case where the corresponding image of the other domain is an image of edges, an image of the other domain that is a converted image can be obtained by applying an edge detection filter to the normal image that is the unconverted image. Alternatively, for example, a user may generate the corresponding image of the other domain in advance, and the normal image analysis unit 121 may acquire the image of the other domain generated in advance. For example in a case where a corresponding image of another domain is an image obtained by dividing a normal image into areas, the image of the other domain can be generated by a user performing area division on the normal image using image editing software or the like.

After the domain conversion learning, the normal image analysis unit 121 causes the storage unit 13 to store information that defines the configuration of the neural network that performs forward domain conversion and inverse domain conversion as a learning result.

The information defining the configuration of the neural network that is stored in the storage unit 13 by the image analysis unit 12 refers to information necessary and sufficient to reproduce input/output of the neural networks at the time of learning. Specifically, such information includes information regarding the structure of the neural network, such as the number of hidden layers of the neural network or the number of units in each layer, and information of weights obtained by learning.

The determination target image analysis unit 122 of the image analysis unit 12 acquires a specified number (for example, one) of captured images from the image acquiring unit 11 in the "inspection mode," and performs a domain-converted image acquiring process on the basis of each of the captured images. Hereinafter, among the captured images acquired by the determination target image analysis unit 122 from the image acquiring unit 11, an image acquired for determination of an abnormality of the target object 3 to be determined for abnormality in the "inspection mode" is referred to as the "determination target image." The determination target image is a captured image capturing the target object 3 that the user intends to inspect. In the domain-converted image acquiring process, the determination target image analysis unit 122 generates, for each determination target image, a domain-converted image that is used to determine whether or not an abnormality is occurring in the target object 3 captured in the determination target image. The domain-converted image will be described later.

Specifically, first, the determination target image analysis unit 122 acquires a specified number of determination target images from the image acquiring unit 11.

The number of determination target images that the determination target image analysis unit 122 acquires for the domain-converted image acquiring process may be specified in advance or may be specified from the control unit 10. A specific method for the determination target image analysis unit 122 to acquire the specified number of determination target images is similar to the specific method for the normal image analysis unit 121 to acquire the specified number of normal images in the "learning mode."

Next, the determination target image analysis unit 122 performs domain conversion on the determination target image using information stored in the storage unit 13 that defines the configuration of the neural network.

Specifically, the learning result acquiring unit 123 described later acquires the information that defines the configuration of the neural network stored in the storage unit 13, and outputs the acquired information to the determination target image analysis unit 122. The determination target image analysis unit 122 uses the information output from the learning result acquiring unit 123 to perform domain conversion on the determination target image.

The information defining the configuration of the neural network acquired by the learning result acquiring unit 123 from the storage unit 13 is the information that the normal image analysis unit 121 has caused to be stored as the learning result in the "learning mode."

Figure 5:
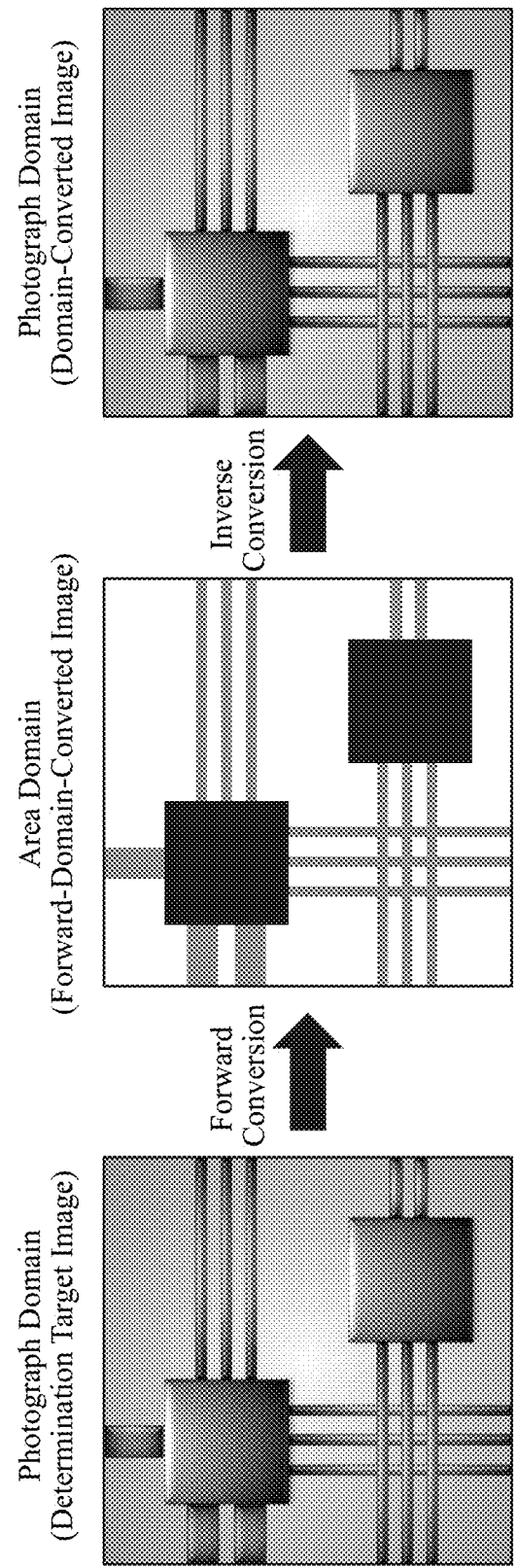
FIG. 5 is a diagram for explaining domain conversion performed on a determination target image by a determination target image analysis unit in the first embodiment.

Here, FIG. 5 is a diagram for explaining domain conversion performed on a determination target image by the determination target image analysis unit 122 in the first embodiment.

As illustrated in FIG. 5, the determination target image analysis unit 122 first converts the determination target image by forward domain conversion to obtain an image of the area domain. Hereinafter, an image of the area domain obtained by performing forward domain conversion on a determination target image in the "inspection mode" by the determination target image analysis unit 122 is also referred to as a "forward-domain-converted image." Note that, as described above, the image acquired by the image acquiring unit 11 from the camera 2 is an image of the photograph domain in the first embodiment, and thus the determination target image is also an image of the photograph domain.

Next, the determination target image analysis unit 122 converts the forward-domain-converted image again by inverse domain conversion to obtain an image of the photograph domain.

Note that, in the first embodiment, it is assumed that the determination target image analysis unit 122 performs domain conversion for converting an image of the photograph domain into an image of the area domain as illustrated in FIG. 5. However, this is merely an example, and the determination target image analysis unit 122 can perform domain conversion that converts an image of the photograph domain into an image of any domain.

Then, the determination target image analysis unit 122 outputs, to the determination unit 14, the determination target image acquired from the image acquiring unit 11, and the image of the photograph domain acquired by sequentially performing forward domain conversion and inverse domain conversion on the determination target image.

Hereinafter, an image of the photograph domain obtained by sequentially performing forward domain conversion and inverse domain conversion on a determination target image in the "inspection mode" by the determination target image analysis unit 122 is referred to as a "domain-converted image."

Note that it is assumed in the first embodiment that the determination target image analysis unit 122 uses a neural network for both forward domain conversion and inverse domain conversion; however, this is merely an example. The determination target image analysis unit 122 does not always need to use a neural network for both forward domain conversion and inverse domain conversion, and may use a neural network only for either the forward domain conversion or the inverse domain conversion.

The learning result acquiring unit 123 of the image analysis unit 12 acquires the learning result stored in the storage unit 13 in the "inspection mode." The learning result stored in the storage unit 13 is information or the like that defines the configuration of a neural network that performs forward domain conversion and inverse domain conversion, which the normal image analysis unit 121 has caused to be stored as a learning result in the "learning mode."

Note that the image analysis unit 12 performs switching between the operation in the "learning mode" by the normal image analysis unit 121 and the operation in the "inspection mode" by the determination target image analysis unit 122 and the learning result acquiring unit 123 on the basis of an instruction from the control unit 10.

The storage unit 13 stores the information or the like that specifies the configuration of a neural network that performs forward domain conversion and inverse domain conversion, which is a learning result obtained by the normal image analysis unit 121 performing domain conversion learning in the "learning mode."

Note that, in the first embodiment, the storage unit 13 is included in the abnormality inspection device 1 as illustrated in FIG. 1; however, without being limited thereto, the storage unit 13 may be installed in a place external to the abnormality inspection device 1 where the abnormality inspection device 1 can refer to.

In the "inspection mode," the determination unit 14 performs an abnormality determination process of determining whether or not an abnormality is occurring in the target object 3 captured in the determination target image by acquiring the determination target image and the domain-converted image output from the determination target image analysis unit 122 and comparing the acquired determination target image with the domain-converted image.

Here, the principle of abnormality inspection using domain conversion will be described.

First, in the "learning mode," the normal image analysis unit 121 causes the neural network to learn using normal images and images of another domain that correspond to the normal images. Therefore, in a case where a determination target image is a normal image in the "inspection mode," the domain-converted image based on the determination target image substantially matches the determination target image acquired from the image acquiring unit 11 (see FIG. 5).

Figure 6:
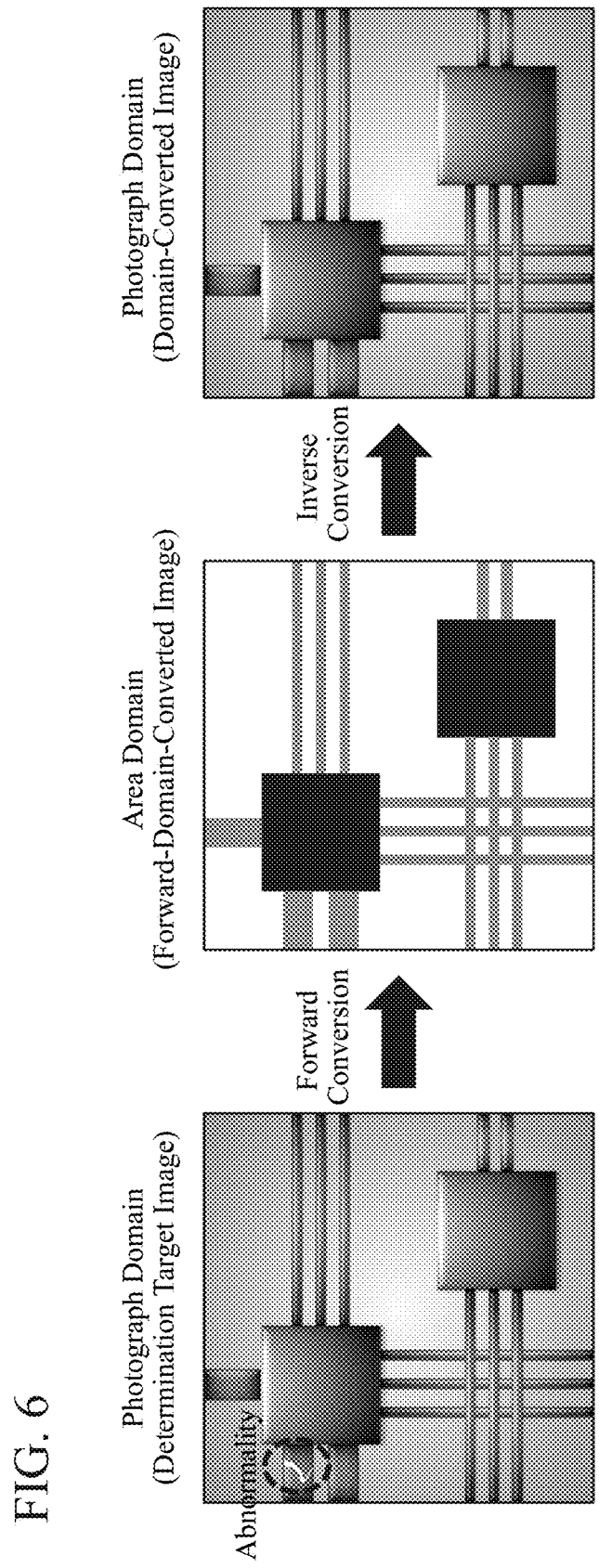
FIG. 6 is a diagram illustrating an example of a determination target image and domain-converted images when an abnormality is occurring in the determination target image in the first embodiment.

On the other hand, in a case where an abnormality is occurring in the target object 3 captured in the determination target image in the "inspection mode," in the determination target image, the state of the target object 3 captured is different from that in the normal image used when the normal image analysis unit 121 has caused the neural network to perform learning. Therefore, when forward domain conversion is performed on the determination target image, the forward domain conversion is not properly performed on the abnormal part of the target object 3. Meanwhile, the domain-converted image that is finally obtained is restored as if it were a normal image. That is, there is a difference between the determination target image and the domain-converted image at the abnormal part in the target object 3 captured in the determination target image (see FIG. 6).

The determination unit 14 determines whether or not an abnormality is occurring in the target object 3 captured in the determination target image using the principle of abnormality inspection using the domain conversion as described above.

The determination unit 14 can detect whether there is an abnormality in the target object 3 and an abnormal part captured in a determination target image by comparing the determination target image and a domain-converted image.

A specific method in which the determination unit 14 determines whether or not an abnormality is occurring in the target object 3 captured in a determination target image will be described.

First, the determination unit 14 calculates an absolute difference value of pixel values between the determination target image and the domain-converted image acquired from the determination target image analysis unit 122.

Specifically, the determination unit 14 calculates absolute difference values between a plurality of pixels included in the determination target image and a plurality of pixels included in the domain-converted image, which positionally correspond to each other. Note that, in the first embodiment, a pixel value refers to the brightness (brightness value).

Figure 7:
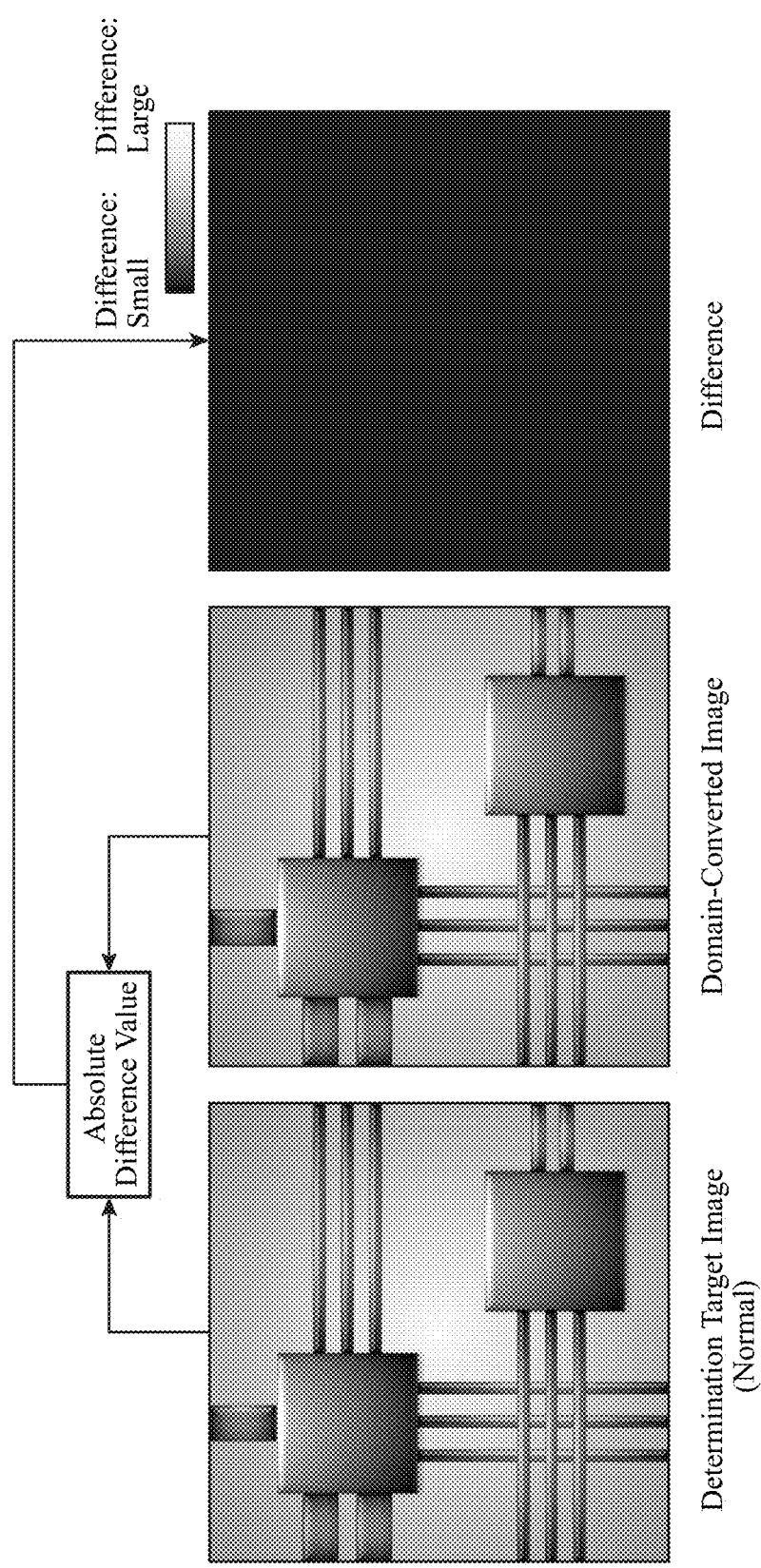
FIG. 7 is a diagram for explaining an absolute difference value between a determination target image and a domain-converted image in a case where the determination target image is a normal image in the first embodiment.

In a case where a determination target image is a normal image, there is substantially no difference between the determination target image and a domain-converted image, and thus the absolute difference value between the determination target image and the domain-converted image is substantially zero over the entire image (see FIG. 7).

Figure 8:
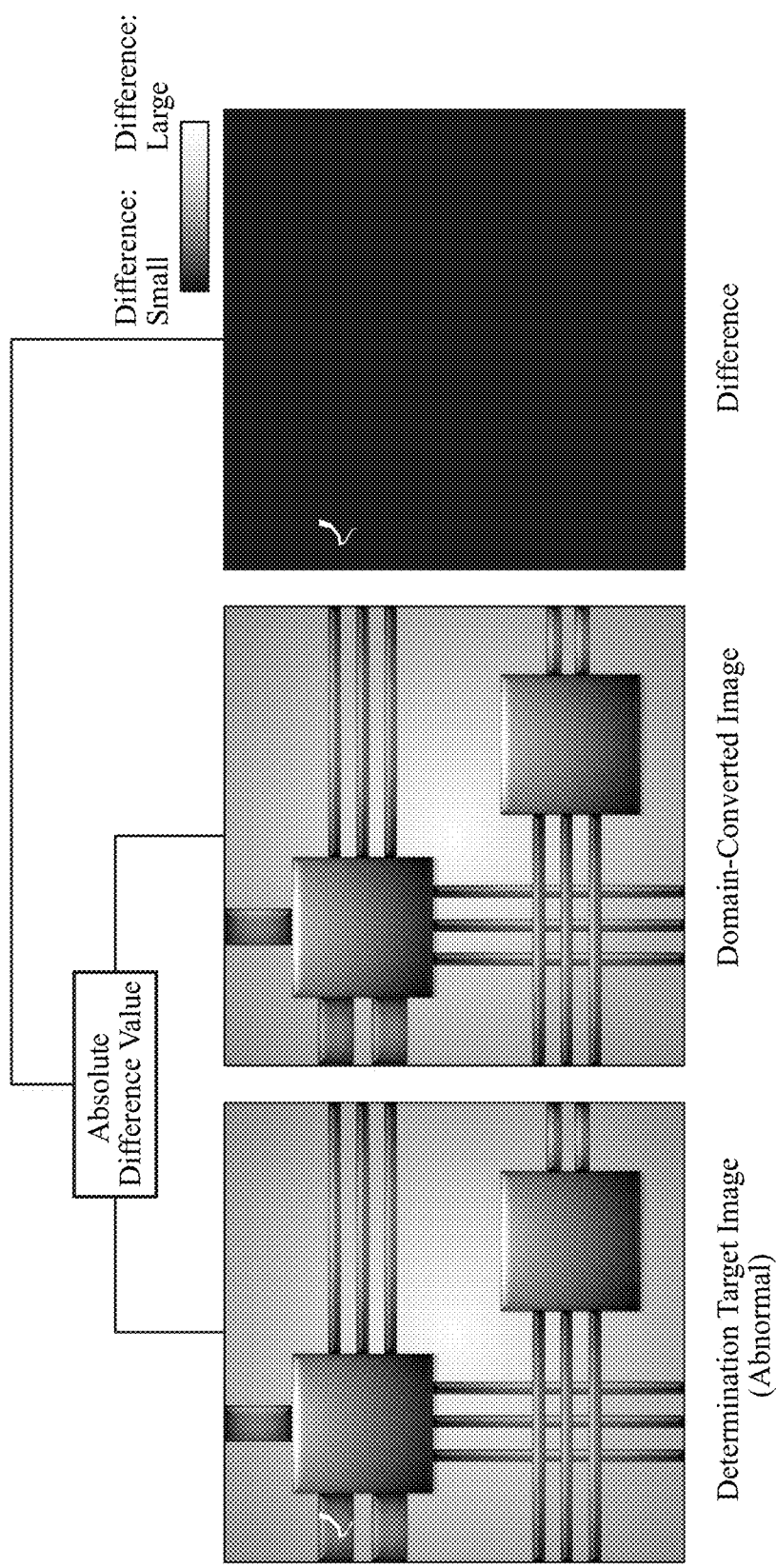
FIG. 8 is a diagram for explaining an absolute difference value between a determination target image and a domain-converted image in a case where an abnormality is occurring in the determination target image in the first embodiment.

On the other hand, in a case where an abnormality is occurring in the target object 3 captured in the determination target image, the abnormal part appears as a difference between the determination target image and the domain-converted image, and thus the absolute difference value between the determination target image and the domain-converted image is large only in the abnormal part (see FIG. 8).

The determination unit 14 generates an image indicating the determination target image with the absolute difference value on the basis of the calculated absolute difference value between the determination target image and the domain-converted image.

Hereinafter, an image in which each pixel of a determination target image is indicated by an absolute difference value between the determination target image and a domain-converted image is referred to as a "difference image."

The determination unit 14 determines whether or not an abnormality is occurring in the target object 3 captured in the determination target image on the basis of the generated difference image as described below.

The determination unit 14 performs a threshold value process on the difference image, and sets the value of a pixel having an absolute difference value of less than a threshold value to 0 and the value of a pixel having an absolute difference value of greater than or equal to the threshold value to 1. Note that this is merely an example, and the determination unit 14 may set the value of a pixel having an absolute difference value of less than the threshold value to 1 and set the value of a pixel having an absolute difference value of greater than or equal to the threshold value to 0, or may set values other than 1 nor 0 as the value of each of a pixel having an absolute difference value of less than the threshold value and the value of a pixel having an absolute difference value of greater than or equal to the threshold value.

The determination unit 14 may determine the threshold value for performing the threshold value process on the difference image by an appropriate method. For example, the determination unit 14 determines the threshold value on the basis of an instruction from the control unit 10. Specifically, for example, a user inputs the threshold value from the input/output device 4, and the control unit 10 accepts the input threshold value. The determination unit 14 determines the threshold value received by the control unit 10 as the threshold value used for the threshold value process.

Alternatively, a user or the like may store the threshold value in the storage unit 13 in advance, and the determination unit 14 may perform the threshold value process using the threshold value stored in the storage unit 13.

Further alternatively, the determination unit 14 may adaptively determine the threshold value depending on the distribution or the like of difference values. Incidentally, a method for adaptively determining a threshold value is disclosed in Non-Patent Literature 2 below, for example.

[Non-Patent Literature 2] Nobuyuki Otsu, "A threshold value Selection Method from Gray-Level Histograms," IEEE Trans. on Systems, Man, and Cybernetics, 1979.

In the method disclosed in Non-Patent Literature 2, when a certain threshold value is determined, let us assume a set of pixels having a pixel value greater than or equal to the threshold value as class 1 and a set of other pixels as class 2. The inter-class variance and the intra-class variance are obtained from the pixel values of class 1 and class 2, and the threshold value is determined so that the degree of separation calculated from these values is maximized.

The determination unit 14 separates into an area formed by the set of pixels having the absolute difference value less than the threshold value and an area formed by the set of pixels having the absolute difference value greater than or equal to the threshold value as a result of the threshold value process, and obtains a rectangle circumscribing the area greater than or equal to the threshold value (hereinafter referred to as the "bounding box"). The determination unit 14 determines a part where the bounding box exists as the area where an abnormality exists in the determination target image.

Note that in a case where that there is no area formed by a set of pixels having an absolute difference value greater than or equal to the threshold value as a result of performing the threshold value process, the determination unit 14 determines that no abnormality is occurring in the target object 3 captured in the determination target image.

As described above, the determination unit 14 performs the threshold value process on the difference image generated by comparing the determination target image and the domain-converted image output from the determination target image analysis unit 122, and determines whether or not an abnormality is occurring in the target object 3 captured in the determination target image.

Figure 9:
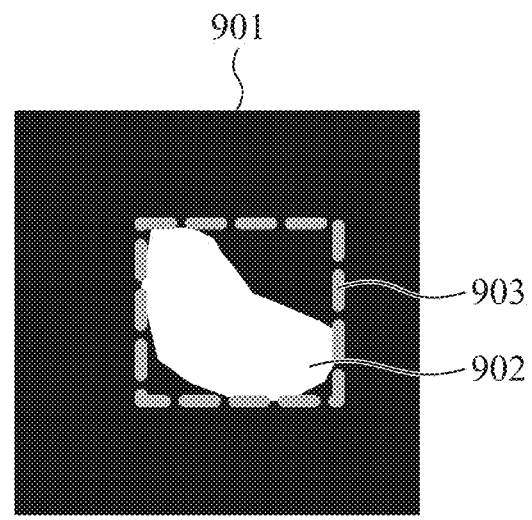
FIG. 9 is a diagram for explaining an example of a result obtained by a determination unit performing a threshold value process on a difference image in the first embodiment.

Here, FIG. 9 is a diagram for explaining an example of a result obtained by the determination unit 14 performing the threshold value process on a difference image in the first embodiment.

The area indicated by 901 in FIG. 9 indicates an area determined by the determination unit 14 to be less than a threshold value in the difference image, and the area indicated by 902 in FIG. 9 indicates an area determined by the determination unit 14 to be greater than or equal to the threshold value in the difference image.

A rectangle denoted by 903 in FIG. 9 is a bounding box. In the determination target image, the place where the bounding box exists is the place where an abnormality is occurring in the captured target object 3.

The determination unit 14 outputs, to the input/output unit 15, information regarding the determination result as to whether or not an abnormality is occurring in the target object 3 captured in the determination target image as described above.

The information regarding the determination result includes at least information for specifying whether or not an abnormality is occurring, such as with or without an abnormality, and information of the determination target image.

In addition, when it is determined that an abnormality is occurring in the target object 3 captured in the determination target image, the determination unit 14 causes the information regarding the bounding box to be included in the information regarding the determination result and outputs the information to the input/output unit 15.

The information related to the bounding box includes, for example, information such as coordinates of an upper left point on an image indicating the bounding box, the vertical width of the bounding box, or the lateral width of the bounding box.

The determination unit 14 may output the difference image to the input/output unit 15.

Note that the determination unit 14 may neglect a bounding box that does not satisfy a predetermined condition (hereinafter referred to as a "bounding box condition") with respect to the position or the size of bounding boxes, and may determine such a bounding box as a place where no abnormality is occurring. In this case, the determination unit 14 includes information indicating that there is no abnormality in the information regarding the determination result that is output to the input/output unit 15, and does not include the information regarding the bounding box. In this manner, it is possible to prevent erroneous detection of an abnormality outside the range of the target area to be determined as to whether or not an abnormality is occurring in the difference image, or erroneous detection of an abnormality due to noise.

The determination unit 14 may determine the bounding box condition by an appropriate method.

For example, the determination unit 14 can determine the bounding box condition on the basis of an instruction from the control unit 10. Specifically, a user inputs the bounding box condition from the input/output device 4, and the control unit 10 receives the input bounding condition and instructs the determination unit 14.

Alternatively, for example, the user or the like may store the bounding condition in the storage unit 13, and the determination unit 14 may determine a bounding box when an abnormality exists on the basis of the bounding condition stored in the storage unit 13.

The bounding conditions stored in the storage unit 13 are, for example, as followings.

The vertical width of the bounding box is greater than or equal to 10 pixels.

The lateral width of the bounding box is greater than or equal to 10 pixels.

Two-dimensional mask for limiting the target area

Figure 10A:
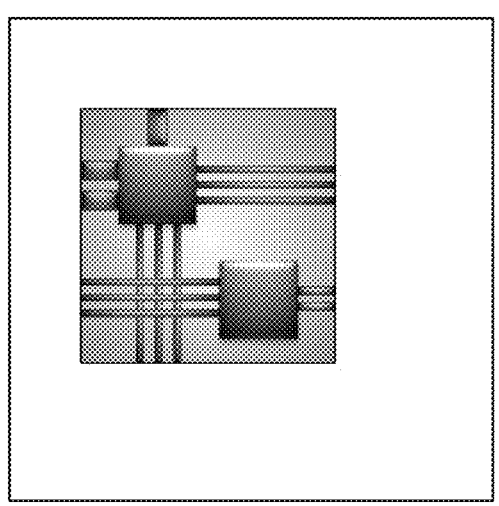
FIGS. 10A and 10B are diagrams for explaining an example of a two-dimensional mask stored in a storage unit as a bounding condition in the first embodiment.
Figure 10B:
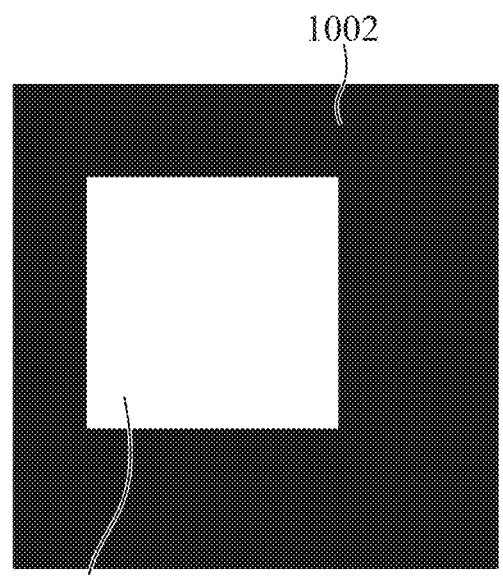

Here, FIG. 10 is a diagram for explaining an example of the two-dimensional mask stored in the storage unit 13 as the bounding condition in the first embodiment. FIG. 10B is a diagram illustrating an image of the two-dimensional mask, and FIG. 10A is a diagram illustrating an image obtained by superimposing the two-dimensional mask illustrated in FIG. 10B over a determination target image.

In the two-dimensional mask of FIG. 10B, the area indicated by 1001 in FIG. 10B represents the target area. The determination unit 14 neglects any bounding box detected in a non-target area indicated by 1002 in FIG. 10B in the difference image generated on the basis of the determination target image.

Let us return to the description of FIG. 1.

The input/output unit 15 transmits, to the input/output device 4, the information regarding the determination result that is output from the determination unit 14.

The input/output device 4 receives the information transmitted from the input/output unit 15 and displays the received information on, for example, a display.

The user confirms the display of the input/output device 4 and inspects whether the target object 3 is in an abnormal state.

In the first embodiment, as an example, the input/output device 4 is, for example, a personal computer (PC) including a display.

An example of a screen when information regarding the determination result is displayed on the display in the input/output device 4 will be described with reference to drawings in the operation description described later.

Note that, the input/output unit 15 transmits the information regarding the determination result to the input/output device 4 in the first embodiment; however, this is merely an example, and the input/output unit 15 may transmit the information regarding the determination result to, for example, an external control device or the like.

Figure 11A:
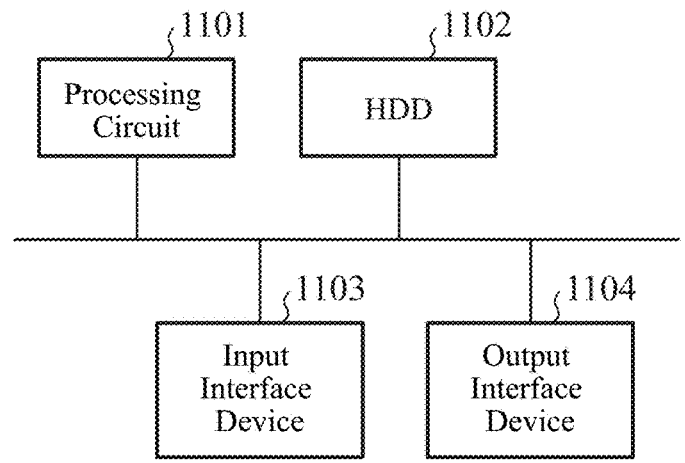
FIGS. 11A and 11B are diagrams illustrating exemplary hardware configurations of the abnormality inspection device according to the first embodiment of the present invention.
Figure 11B:
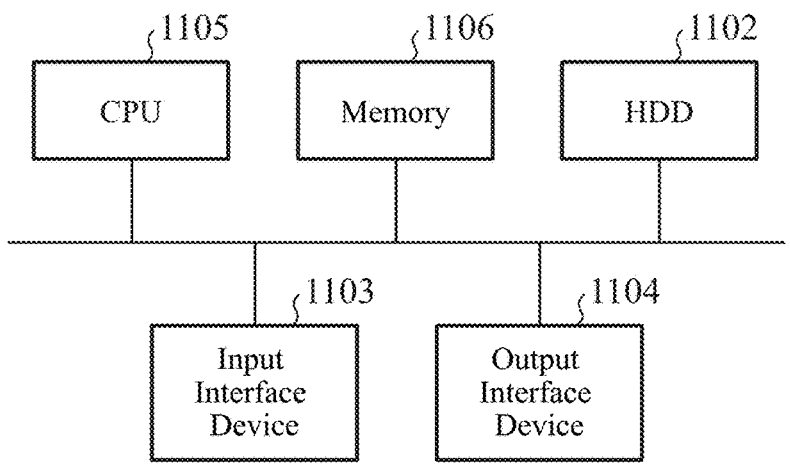

FIGS. 11A and 11B are diagrams each illustrating an exemplary hardware configuration of the abnormality inspection device 1 according to the first embodiment.

In the first embodiment of the present invention, the functions of the control unit 10, the image acquiring unit 11, the image analysis unit 12, and the determination unit 14 are implemented by a processing circuit 1101. That is, the abnormality inspection device 1 includes the processing circuit 1101 for performing control to determine, on the basis of an acquired image, whether or not an abnormality is occurring in the target object 3 captured in the image and to output the determination result.

The processing circuit 1101 may be dedicated hardware as illustrated in FIG. 11A or a central processing unit (CPU) 1105 for executing a program stored in a memory 1106 as illustrated in FIG. 11B.

In a case where the processing circuit 1101 is dedicated hardware, the processing circuit 1101 corresponds to, for example, a single circuit, a composite circuit, a programmed processor, a parallel programmed processor, an application specific integrated circuit (ASIC), a field-programmable gate array (FPGA), or a combination thereof.

In a case where the processing circuit 1101 is the CPU 1105, the functions of the control unit 10, the image acquiring unit 11, the image analysis unit 12, and the determination unit 14 are implemented by software, firmware, or a combination of software and firmware. That is, the control unit 10, the image acquiring unit 11, the image analysis unit 12, and the determination unit 14 are implemented by the CPU 1105 or a processing circuit such as a system large scale integration (LSI) that executes programs stored in a hard disk drive (HDD) 1102, the memory 1106, or the like. It is also understood that programs stored in the HDD 1102, the memory 1106, and the like cause a computer to execute the procedures and methods of the control unit 10, the image acquiring unit 11, the image analysis unit 12, and the determination unit 14. Here, the memory 1106 may be a nonvolatile or volatile semiconductor memory such as a random access memory (RAM), a read only memory (ROM), a flash memory, an erasable programmable read only memory (EPROM), or an electrically erasable programmable read only memory (EEPROM), a magnetic disc, a flexible disc, an optical disc, a compact disc, a mini disc, a digital versatile disc (DVD), or the like.

Note that a part of the functions of the control unit 10, the image acquiring unit 11, the image analysis unit 12, and the determination unit 14 may be implemented by dedicated hardware and another part thereof may be implemented by software or firmware. For example, the function of the control unit 10 may be implemented by the processing circuit 1101 as dedicated hardware while the functions of the image acquiring unit 11, the image analysis unit 12, and the determination unit 14 may be implemented by the processing circuit reading and executing a program stored in the memory 1106.

As the storage unit 13, for example, the HDD 1102 is used. Note that this is merely one example, and the storage unit 13 may be implemented by a DVD, the memory 1106, or the like. The storage unit 13 includes various recording media.

The abnormality inspection device 1 also includes an input interface device 1103 and an output interface device 1104 that communicate with devices such as the camera 2 or the input/output device 4.

The input/output unit 15 includes the input interface device 1103 and the output interface device 1104.

Next, the operation of the abnormality inspection device 1 according to the first embodiment will be described.

In the following description of the operation, the operation of the abnormality inspection device 1 in the "learning mode" and the operation of the abnormality inspection device 1 in the "inspection mode" will be described separately.

First, the operation of the abnormality inspection device 1 in the "learning mode" will be described.

Figure 12:
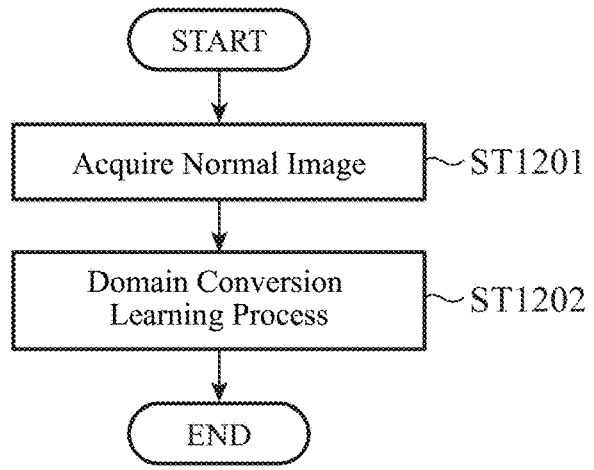
FIG. 12 is a flowchart for explaining the operation of the abnormality inspection device in a "learning mode" in the first embodiment.

FIG. 12 is a flowchart for explaining the operation of the abnormality inspection device 1 in the "learning mode" in the first embodiment.

The image acquiring unit 11 acquires a captured image from the camera 2 via the network (step ST1201).

As described above, all the captured images acquired by the image acquiring unit 11 in the "learning mode" are "normal images."

Note that the process in step ST1201 is performed by the control unit 10 by receiving an activation signal and a setting signal from the input/output device 4 and controlling the image acquiring unit 11 to acquire captured images. Specifically, for example, a user activates the abnormality inspection device 1 in the input/output device 4 and sets the "learning mode." The input/output device 4 transmits, to the abnormality inspection device 1, the activation signal of the abnormality inspection device 1 and a setting signal for setting the abnormality inspection device 1 to the "learning mode" on the basis of the instruction from the user. The control unit 10 receives the activation signal and the setting signal input from the user.

The image acquiring unit 11 outputs the acquired normal image to the normal image analysis unit 121 of the image analysis unit 12.

The normal image analysis unit 121 acquires the specified number of normal images from the image acquiring unit 11, and performs the domain conversion learning process on the basis of the acquired normal images (step ST1202).

The process of step ST1202 is performed by the control unit 10 instructing the image analysis unit 12 to operate in the "learning mode."

Figure 13:
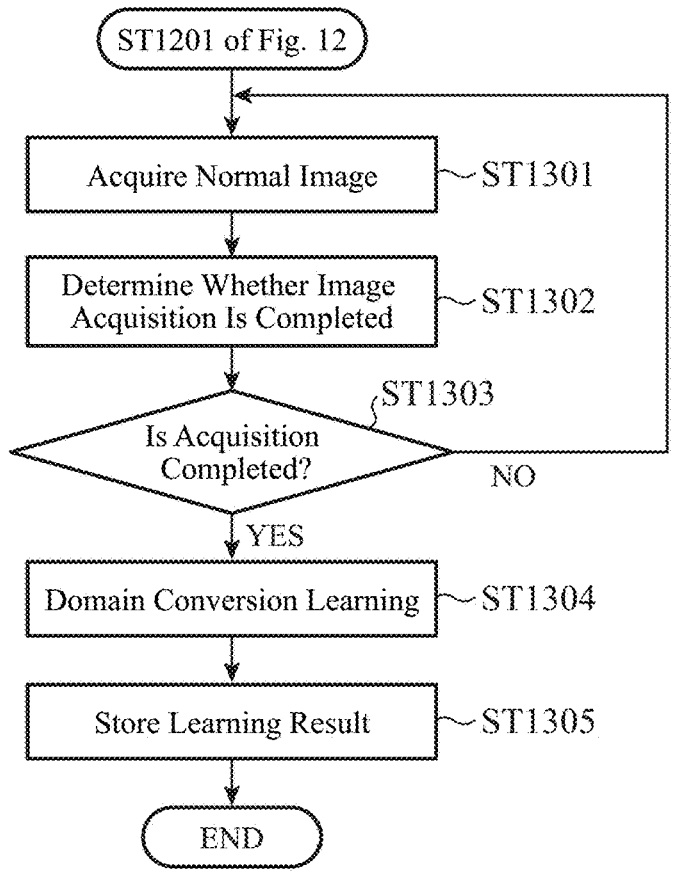
FIG. 13 is a flowchart for explaining the details of a domain conversion learning process performed by a normal image analysis unit in step ST1202 of FIG. 12 in the first embodiment.

Here, FIG. 13 is a flowchart for explaining the details of the domain conversion learning process performed by the normal image analysis unit 121 in step ST1202 of FIG. 12 in the first embodiment.

Having acquired the normal images output from the image acquiring unit 11 in step ST1201 of FIG. 12 (step ST1301), the normal image analysis unit 121 determines whether image acquisition has completed (step ST1302).

Specifically, the normal image analysis unit 121 determines whether the predetermined number of normal images have been acquired for use in domain conversion learning.

If the normal image analysis unit 121 determines that the predetermined number of normal images have not been acquired (in the case of "NO" in step ST1303), the normal image analysis unit 121 returns to step ST1301 and keeps acquiring normal images that are output from the image acquiring unit 11.

If the normal image analysis unit 121 determines that the predetermined number of normal images have been acquired (in the case of "YES" in step ST1303), the normal image analysis unit 121 terminates the acquisition of the normal images and proceeds to step ST1304.

The normal image analysis unit 121 acquires an image of the corresponding other domain for each of the normal images acquired from the image acquiring unit 11 in step ST1301, and causes the neural network to learn to perform forward domain conversion and inverse domain conversion (step ST1304).

After causing the neural network to learn in step ST1304, the normal image analysis unit 121 stores, in the storage unit 13, information that defines the configuration of the neural network that performs forward domain conversion and inverse domain conversion as a learning result (step ST1305).

Specifically, the normal image analysis unit 121 causes the storage unit 13 to store the information that defines the configuration of the neural network via the control unit 10. The control unit 10 instructs the storage unit 13 to store the information that defines the configuration of the neural network.

As described above, in the "learning mode," the abnormality inspection device 1 causes the neural network to learn that is used in the "inspection mode" performed later on the basis of the normal images acquired from the camera 2, and stores the information that defines the configuration of the neural network that has been caused to learn.

Next, the operation of the abnormality inspection device 1 in the "inspection mode" will be described.

Figure 14:
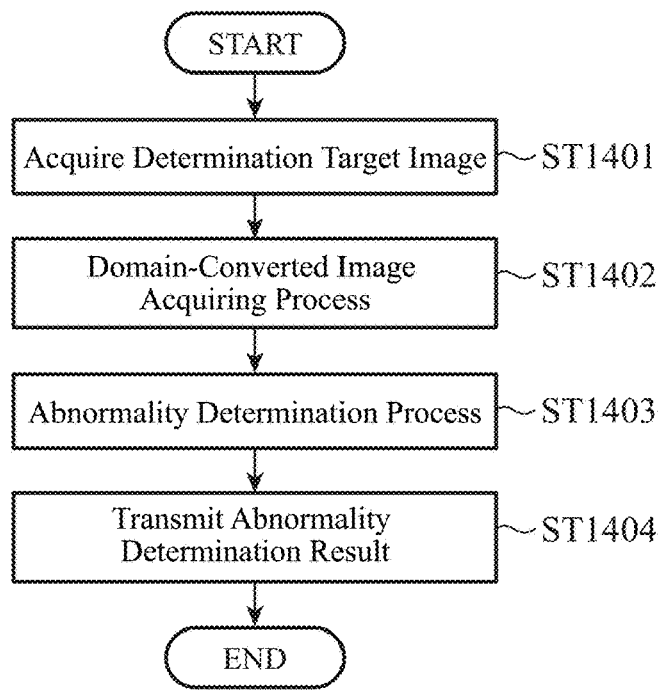
FIG. 14 is a flowchart for explaining the operation of the abnormality inspection device in an "inspection mode" in the first embodiment.

FIG. 14 is a flowchart for explaining the operation of the abnormality inspection device 1 in the "inspection mode" in the first embodiment.

The image acquiring unit 11 acquires a determination target image from the camera 2 via the network (step ST1401).

Note that the process in step ST1401 is performed by the control unit 10 by receiving an activation signal and a setting signal from the input/output device 4 and controlling the image acquiring unit 11 to acquire captured images. Specifically, for example, a user activates the abnormality inspection device 1 in the input/output device 4 and sets the "inspection mode." The input/output device 4 transmits, to the abnormality inspection device 1, the activation signal of the abnormality inspection device 1 and a setting signal for setting the abnormality inspection device 1 to the "inspection mode" on the basis of the instruction from the user. The control unit 10 receives the activation signal and the setting signal input from the user.

The image acquiring unit 11 outputs the acquired determination target image to the determination target image analysis unit 122 of the image analysis unit 12.

The determination target image analysis unit 122 acquires a specified number of determination target images from the image acquiring unit 11, and performs the domain-converted image acquiring process on the basis of the acquired determination target images (step ST1402).

The process of step ST1402 is performed by the control unit 10 instructing the determination target image analysis unit 122 to operate in the "inspection mode."

Figure 15:
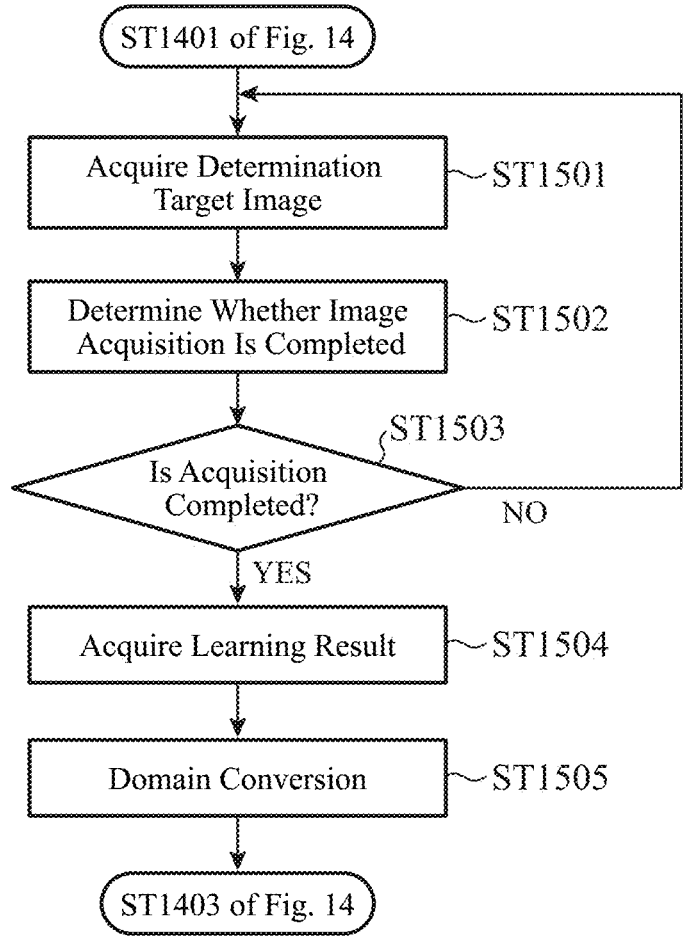
FIG. 15 is a flowchart for explaining the details of a domain-converted image acquiring process performed by the determination target image analysis unit in step ST1402 of FIG. 14 in the first embodiment.

FIG. 15 is a flowchart for explaining the details of the domain-converted image acquiring process performed by the determination target image analysis unit 122 in step ST1402 of FIG. 14 in the first embodiment.

Having acquired the determination target image output from the image acquiring unit 11 in step ST1401 (step ST1501), the determination target image analysis unit 122 determines whether image acquisition has completed (step ST1502).

Specifically, the determination target image analysis unit 122 determines whether the specified number of determination target images, for determination of an abnormality, has been acquired.

If the determination target image analysis unit 122 determines that the specified number of determination target images have not been acquired (in the case of "NO" in step ST1503), the determination target image analysis unit 122 returns to step ST1501, and keeps acquiring determination target images output from the image acquiring unit 11.

If the determination target image analysis unit 122 determines that the specified number of determination target images have been acquired (in the case of "YES" in step ST1503), the determination target image analysis unit 122 terminates acquisition of the determination target images and proceeds to step ST1504.

The learning result acquiring unit 123 acquires information defining the configuration of the neural network that is stored in the storage unit 13 (step ST1504).

The learning result acquiring unit 123 outputs the acquired information to the determination target image analysis unit 122.

The determination target image analysis unit 122 performs domain conversion of the determination target images using the information acquired by the learning result acquiring unit 123 in step ST1504 (step ST1505).

Specifically, the determination target image analysis unit 122 sequentially performs forward domain conversion and inverse domain conversion on the determination target images to obtain domain-converted images.

Then, the determination target image analysis unit 122 outputs the determination target images acquired from the image acquiring unit 11 in step ST1501 and the domain-converted images obtained in step ST1505 to the determination unit 14.

Let us refer back to the flowchart illustrated in FIG. 14.

The determination unit 14 acquires the determination target images and the domain-converted images output from the determination target image analysis unit 122 in step ST1402, and performs abnormality determination process by comparing the acquired determination target images and the acquired domain-converted images (step ST1403).

Figure 16:
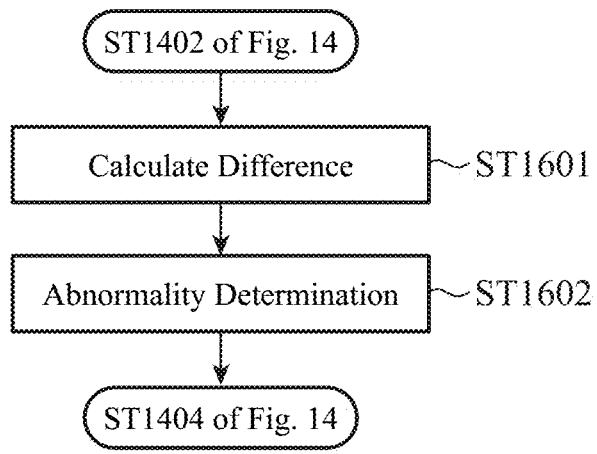
FIG. 16 is a flowchart illustrating the details of an abnormality determination process performed by the determination unit in step ST1403 of FIG. 14 in the first embodiment.

Here, FIG. 16 is a flowchart illustrating the details of the abnormality determination process performed by determination unit 14 in step ST1403 of FIG. 14 in the first embodiment.

The determination unit 14 calculates absolute difference values between a determination target image and a domain-converted image acquired from the determination target image analysis unit 122 in step ST1402 of FIG. 14, and generates a difference image (step ST1601).

The determination unit 14 performs a threshold value process on the difference image generated by comparing the determination target image and the domain-converted image, and determines whether or not an abnormality is occurring in the target object 3 captured in the determination target image (step ST1602).

The determination unit 14 outputs, to the input/output unit 15, information regarding the determination result as to whether or not an abnormality is occurring in the target object 3 captured in the determination target image.

Let us refer back to the flowchart illustrated in FIG. 14.

The input/output unit 15 transmits the information regarding the determination result output from the determination unit 14 in step ST1403 to the input/output device 4 (step ST1404).

In the case of the "inspection mode," the control unit 10 provides an operation instruction to the input/output unit 15 after the abnormality determination process by the determination unit 14.

When the input/output unit 15 transmits the information of the determination result, the input/output device 4 receives the information transmitted from the input/output unit 15, and displays the received information on, for example, the display.

Figure 17:
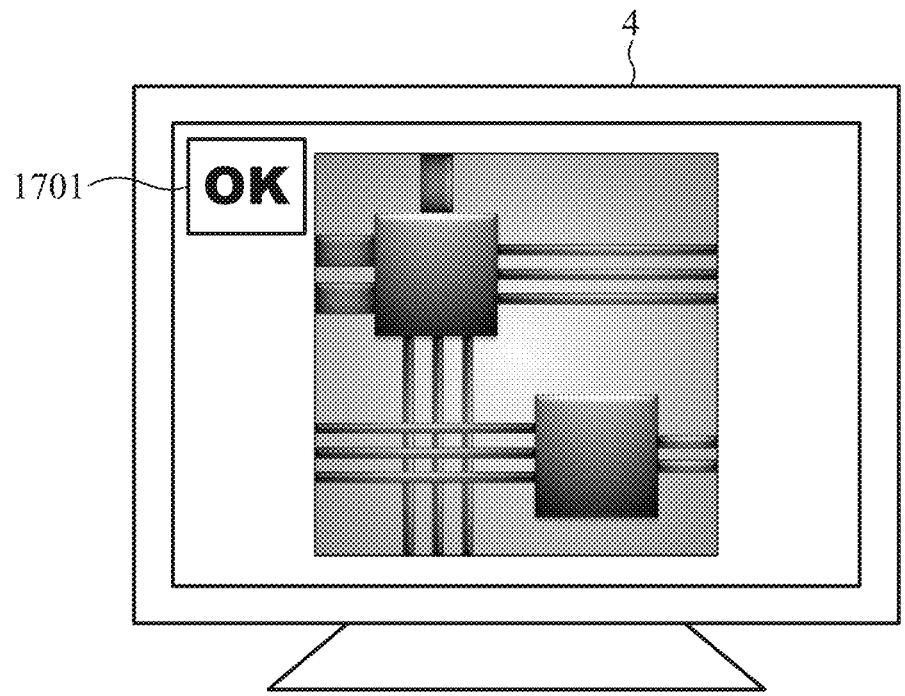
FIG. 17 is a diagram for explaining an example of an image of a display screen obtained by displaying, on a display, information regarding a determination result that is transmitted from an input/output unit and received by an input/output device in the first embodiment.
Figure 18:
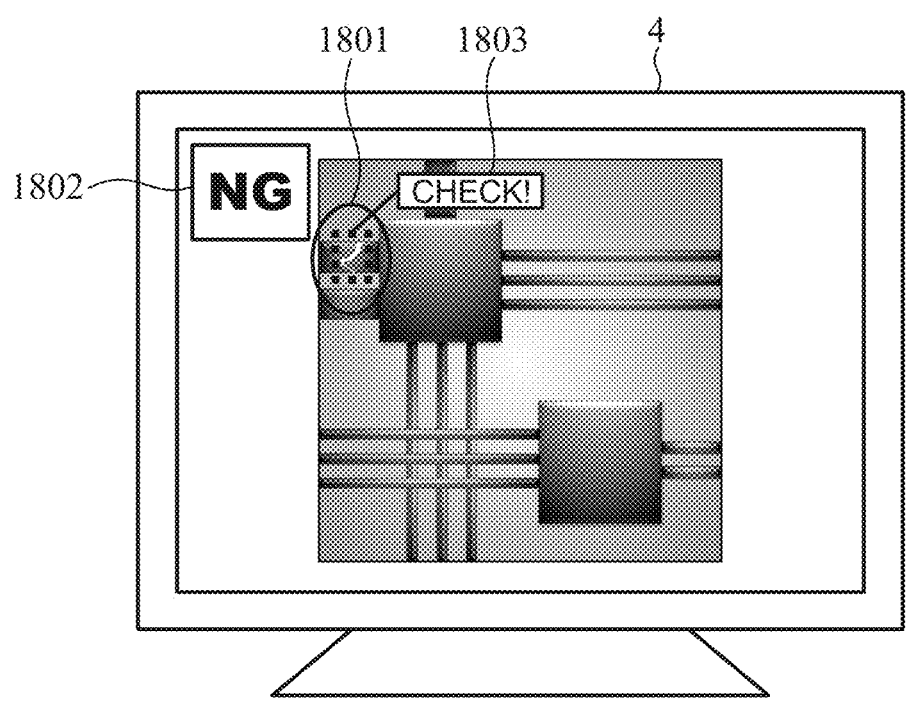
FIG. 18 is a diagram for explaining another example of an image of a display screen obtained by displaying, on the display, information regarding a determination result that is transmitted from the input/output unit and received by the input/output device in the first embodiment.
Figure 19:
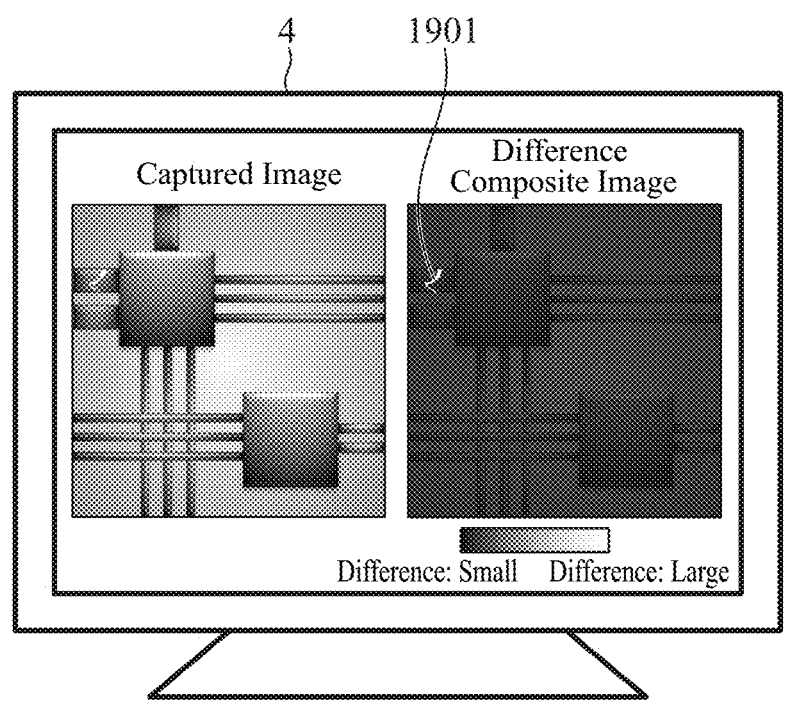
FIG. 19 is a diagram for explaining still another example of an image of a display screen obtained by displaying, on the display, information regarding a determination result that is transmitted from the input/output unit and received by the input/output device in the first embodiment.

Here, FIG. 17 to FIG. 19 are diagrams for explaining examples of a picture of a display screen displaying, on the display, information regarding the determination result that is transmitted from the input/output unit 15 and received by the input/output device 4 in the first embodiment.

FIG. 17 is a diagram illustrating an example of a picture of a display screen displayed by the input/output device 4 when a determination result by the determination unit 14 that no abnormality is occurring in the target object 3 captured in a determination target image is transmitted from the input/output unit 15.

In this case, the input/output device 4 simply displays the determination target image on the display as it is, and displays a message (see 1701 in FIG. 17) on the display for notifying that there is no abnormality.

In FIG. 17, characters of "OK" are displayed as an example of the message for notifying that there is no abnormality. Note that this is merely an example, and it is only required that the input/output device 4 display an appropriate message that can notify the user that there is no abnormality.

FIG. 18 is a diagram illustrating an example of a picture of a display screen displayed by the input/output device 4 when a determination result by the determination unit 14 that an abnormality is occurring at one place in the target object 3 captured in a determination target image is transmitted from the input/output unit 15.

In this case, the input/output device 4 superimposes and displays the abnormal part on the determination target image (see 1801 in FIG. 18) and displays a message, on the display, for notifying that an abnormality is occurring (see 1802 in FIG. 18). In FIG. 18, as an example, the input/output device 4 displays "NG" as a message for notifying that an abnormality is occurring.

Further, the input/output device 4 superimposes the abnormal part on the determination target image for display and causes the display to display a message (see 1803 in FIG. 18) for calling attention to the abnormal part. In FIG. 18, as an example, the input/output device 4 displays "CHECK!" as a message for calling attention to the abnormal part. Note that, it is only required that the input/output device 4 specify the abnormal part from the information of the bounding box included in the information regarding the determination result transmitted from the input/output unit 15.

In FIG. 18, the characters "NG" are displayed as an example of the message for notifying that an abnormality is occurring; however, this is merely an example. It is only required that the input/output device 4 display an appropriate message that can notify the user that an abnormality is occurring. In FIG. 18, the characters of "CHECK!" are displayed as an example of a message for calling attention to the abnormal part; however, this is merely an example. It is only required that the input/output device 4 display an appropriate message that can prompt the user to pay attention to the abnormal part.

FIG. 19 is a diagram illustrating another example of a picture of a display screen displayed by the input/output device 4 when a determination result by the determination unit 14 that an abnormality is occurring at one place in the target object 3 captured in a determination target image is transmitted from the input/output unit 15.

When it is determined that an abnormality is occurring in the target object 3 captured in the determination target image, the input/output device 4 may cause the display to display a composite image obtained by combining the difference image with the determination target image as illustrated in FIG. 19 without directly displaying the abnormal part as illustrated in FIG. 18.

In FIG. 19, for example, the input/output device 4 displays the determination target image on the left side and the above-described composite image on the right side.

In the composite image, the part where the difference from the normal state is large in the determination target image is displayed so as to be noticeable (see 1901 in FIG. 19), and thus the user can be easily grasp the part that should be noticed when an abnormality inspection is performed.

Note that various methods are conceivable as the method for generating a composite image, and it is only required for the input/output device 4 to generate a composite image by an appropriate method.

For example, the input/output device 4 may generate a composite image in which a part having a small difference is displayed dark and a part having a large difference is displayed bright (see FIG. 19), or may display in colors so that a part having a small difference is displayed in blue and that, as the difference becomes larger, the difference is displayed in darker red.

Meanwhile, the pictures of the display screens as illustrated in FIG. 17 to FIG. 19 are merely examples, and the input/output device 4 may display other display screens. For example, the input/output device 4 may display a combination of display screens as illustrated in FIG. 17 to FIG. 19. Alternatively, in a case where the input/output device 4 is implemented by an audio output device such as a speaker instead of the display, the input/output device 4 may output the information regarding the determination result transmitted from the input/output unit 15 by, for example, voice, music, or the like.

As described above, in the "inspection mode," the abnormality inspection device 1 performs domain conversion on the determination target image acquired from the camera 2 using the information that has been learned in advance and defines the configuration of the neural network to obtain the domain-converted image. Then, the abnormality inspection device 1 performs the threshold value process on the difference image generated by comparison between the determination target image and the domain-converted image, and determines whether or not an abnormality is occurring in the determination target image.

As a method for determining whether or not an abnormality is occurring in the target object 3 captured in the determination target image, for example, a normal image captured in the past may be stored, and the stored normal image and a newly acquired determination target image may be compared. In that case, however, various factors as described below appear as differences between the images in addition to an abnormality to be detected.

Difference in lighting conditions

Difference in positional relationship between camera 2 and target object 3

Variations in the target object 3 within a normal range (such as color differences that should not be determined as abnormal, or surface scratches that should not be determined as abnormal)

It is difficult to distinguish between differences between a normal image and a determination target image attributable to factors as described above and differences between the normal image and the determination target image attributable to occurrence of an abnormality in the target object 3. Therefore, it is not possible to detect an abnormality with high accuracy by simply comparing a normal image captured in the past and a determination target image.

One approach to improve the detection accuracy of a difference between a normal image and a determination target image may be, for example, to devise the imaging system so that the lighting condition and the positional relationship between the camera 2 and the target object 3 are kept constant. However, even with such an approach, there is a disadvantage that the cost of the imaging system increases such as the need for a light shielding plate for covering the surroundings of the camera 2 or the target object 3 or a jig for positioning the camera 2 or the target object 3 with high accuracy.

Contrary to the above, in the abnormality inspection device 1 according to the first embodiment, the image analysis unit 12 obtains a domain-converted image by directly using a determination target image using the neural network that has previously been caused to learn, and the determination unit 14 determines whether an abnormality is occurring in the determination target image by comparing the determination target image and the domain-converted image.

Therefore, it is possible to perform highly accurate abnormality determination that is not affected by a difference in imaging conditions or a difference between the images attributable to variations within a normal range as described above.

In addition, the abnormality inspection device 1 does not require the target object nor the camera to be reliably secured nor require a device for highly accurate positioning, and thus an increase in the introduction cost can be suppressed.

As described above, according to the first embodiment, the abnormality inspection device 1 includes: the image acquiring unit 11 for acquiring a determination target image capturing the target object 3 to be inspected; the learning result acquiring unit 123 for acquiring a result of machine learning of forward domain conversion of an image or inverse domain conversion of an image performed using a normal image capturing the target object 3 in a normal state as training data; the determination target image analysis unit 122 for obtaining a domain-converted image by sequentially performing forward domain conversion and inverse domain conversion on the determination target image acquired by the image acquiring unit 11, using the result of the machine learning acquired by the learning result acquiring unit 123; and the determination unit 14 for determining whether or not an abnormality is occurring in the target object 3 captured in the determination target image by comparing the determination target image acquired by the image acquiring unit 11 and the domain-converted image acquired by the determination target image analysis unit 122. Therefore, it is possible to inspect an abnormality of a target object without being affected by a difference in imaging conditions or a difference between images due to variations within a normal range.

In addition, for example, a user or the like does not need to define in detail what state an abnormality is in the determination target image, and application can be made universally to any type of abnormality.

Furthermore, in the learning mode, machine learning can be performed using a plurality of images in which the positional relationship between the target object and the camera is not constant. In a case where such machine learning is performed, any image can be subjected to inspection in the inspection mode, and there is an effect that it is not necessary to reliably secure the target object and the camera nor to perform highly accurate positioning.

Second Embodiment

In the first embodiment, the abnormality inspection device 1 learns in advance the configuration of the neural network on the basis of a normal image, and determines whether or not an abnormality is occurring in the target object 3 captured in the determination target image using the learning result.

In a second embodiment, an embodiment will be described in which an abnormality inspection device 1a further analyzes an abnormality occurring in a target object 3 captured in a determination target image.

Figure 20:
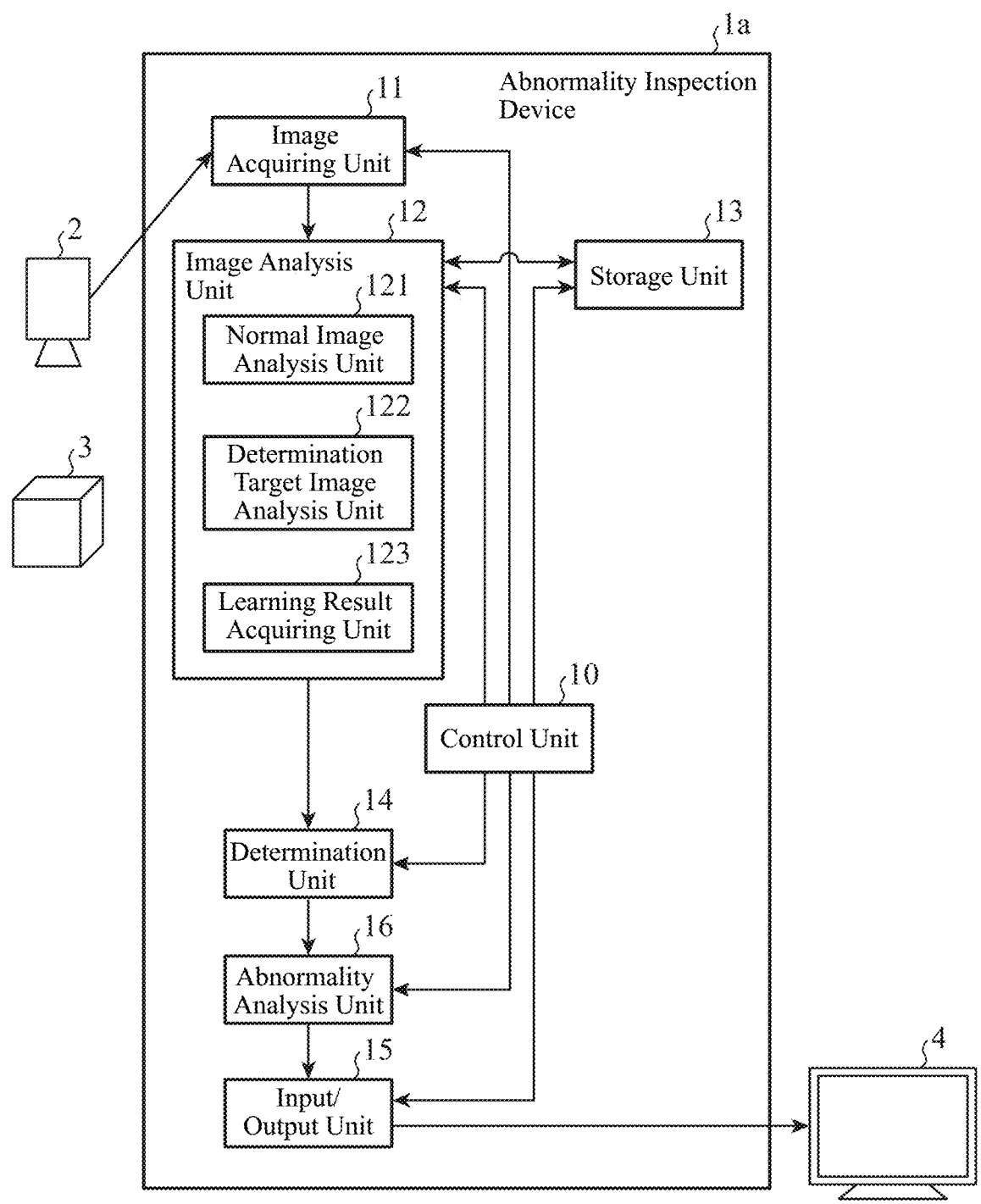
FIG. 20 is a diagram illustrating a configuration example of an abnormality inspection device according to a second embodiment.

FIG. 20 is a diagram illustrating a configuration example of the abnormality inspection device 1a according to the second embodiment.

The abnormality inspection device 1a illustrated in FIG. 20 is different from the abnormality inspection device 1 described with reference to FIG. 1 in the first embodiment in that an abnormality analysis unit 16 is included. Since the configuration of the abnormality inspection device 1a other than the abnormality analysis unit 16 is similar to that of the abnormality inspection device 1 of the first embodiment, the same components are denoted by the same symbols, and redundant description is omitted.

In the abnormality inspection device 1a according to the second embodiment, in an "inspection mode," a determination target image analysis unit 122 of an image analysis unit 12 outputs, to a determination unit 14, a forward-domain-converted image (see FIG. 5 and FIG. 6) that is obtained by forward domain conversion of a target image in addition to the determination target image and a domain-converted image.

In the "inspection mode," the determination unit 14 acquires the determination target image, the forward-domain-converted image, and the domain-converted image output from the determination target image analysis unit 122. Having compared the determination target image and the domain-converted image and performed the abnormality determination process, the determination unit 14 outputs the information regarding the determination result to the abnormality analysis unit 16. At this point, the determination unit 14 outputs the forward-domain-converted image acquired from the determination target image analysis unit 122 to the abnormality analysis unit 16 together with the information regarding the determination result.

Note that the specific content of the abnormality determination process by the determination unit 14 is as described in the first embodiment, and thus redundant description is omitted.

In the "inspection mode," the abnormality analysis unit 16 performs an abnormality analysis process on the basis of the information regarding the determination result and the forward-domain-converted image output from the determination unit 14, and outputs the information regarding the abnormality analysis result to an input/output unit 15.

Specifically, the abnormality analysis unit 16 analyzes in which area in the determination target image an abnormality is occurring by, for example, superimposing a bounding box and the forward-domain-converted image in a case where the determination unit 14 outputs the information regarding a determination result indicating that an abnormality is occurring in the target object 3 captured in the determination target image.

Note that the information regarding the bounding box is included in the information regarding the determination result output from the determination unit 14.

Figure 21:
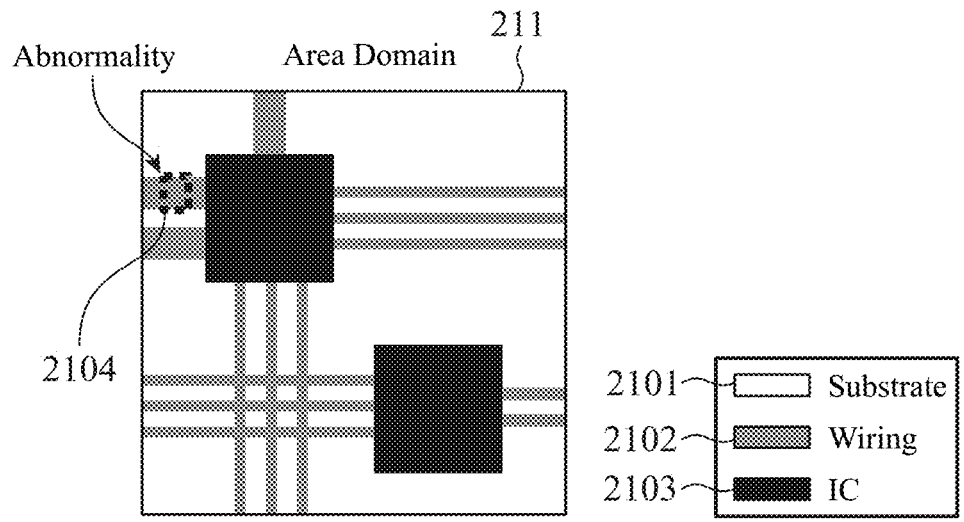
FIG. 21 is a diagram illustrating an exemplary image in which an abnormality analysis unit overlaid a bounding box and an image of the area domain in the second embodiment.

For example in a case where the forward-domain-converted image is an image of the area domain obtained by forward domain conversion of the determination target image in the second embodiment, the abnormality analysis unit 16 superimposes the bounding box and the image of the area domain (see FIG. 21).

In FIG. 21, 211 in FIG. 21 indicates the image of the area domain, 2101 in FIG. 21 indicates a substrate area, 2102 in FIG. 21 indicates a wiring area, 2103 in FIG. 21 indicates an IC area, and 2014 in FIG. 21 indicates the bounding box.

In the example illustrated in FIG. 21, an abnormality is occurring in the wiring area. In this case, the abnormality analysis unit 16 analyzes that an abnormality is occurring in the wiring, and outputs information indicating that there is an abnormality in the wiring to the input/output unit 15 as information regarding the abnormality analysis result.

At this point, the abnormality analysis unit 16 outputs the information regarding the determination result acquired from the determination unit 14 to the input/output unit 15 together with the information regarding the abnormality analysis result.

Note that the abnormality analysis unit 16 does not perform abnormality analysis and outputs the information regarding the determination result to the input/output unit 15 as it is in a case where the determination unit 14 outputs information regarding a determination result indicating that no abnormality is occurring in the target object 3 captured in the determination target image.

The abnormality analysis unit 16 may read a desirable piece of information stored in advance in the storage unit 13 for example on the basis of the information that an abnormality is occurring in the wiring area, and output the read information to the input/output unit 15 as the information regarding the abnormality analysis result.

Examples of the desirable piece of information that the abnormality analysis unit 16 reads from the storage unit 13 include an error code that corresponds to the occurring abnormality or a manual for dealing with the occurring abnormality.

Next, the operation of the abnormality inspection device 1a according to the second embodiment will be described.

Also in the abnormality inspection device 1a according to the second embodiment, as in the abnormality inspection device 1 according to the first embodiment, a "learning mode" and the "inspection mode" are performed.

The specific operation in the "learning mode" in the abnormality inspection device 1a is similar to the specific operation in the "learning mode" in the abnormality inspection device 1 described in the first embodiment with reference to FIG. 12 and FIG. 13, and thus redundant description is omitted.

Hereinafter, the operation in the "inspection mode" in the abnormality inspection device 1a according to the second embodiment will be described.

Figure 22:
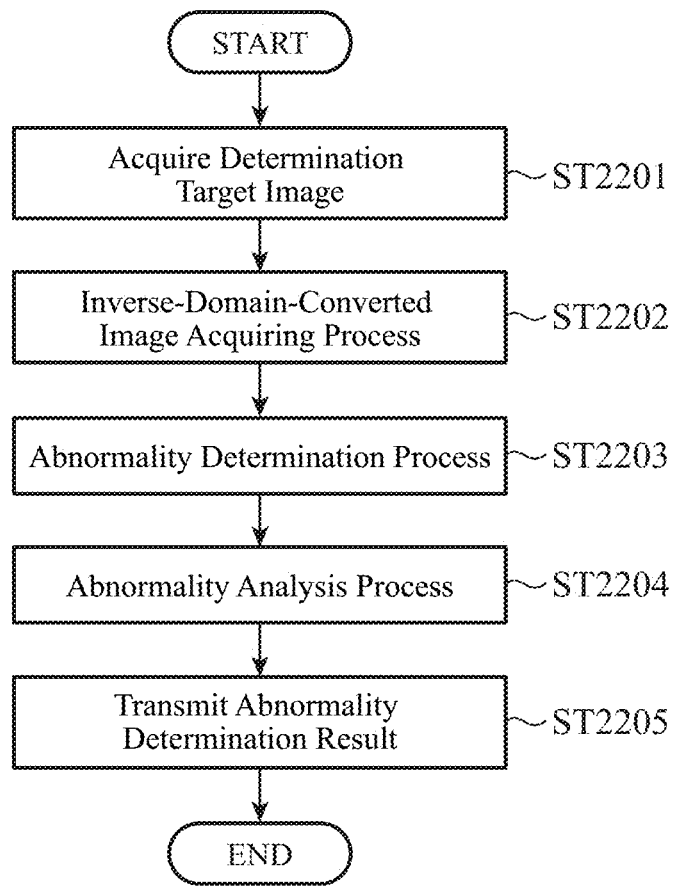
FIG. 22 is a flowchart for explaining the operation of the abnormality inspection device in an "inspection mode" in the second embodiment.

FIG. 22 is a flowchart for explaining the operation of the abnormality inspection device 1a in the "inspection mode" in the second embodiment.

The image acquiring unit 11 acquires a determination target image from the camera 2 via the network (step ST2201). The specific operation of the image acquiring unit 11 in step ST2201 is similar to the specific operation of the image acquiring unit 11 in step ST1401 of FIG. 14 described in the first embodiment.

The image acquiring unit 11 outputs the acquired determination target image to the determination target image analysis unit 122 of the image analysis unit 12.

The determination target image analysis unit 122 acquires a specified number of determination target images from the image acquiring unit 11, and performs the domain-converted image acquiring process on the basis of the acquired determination target images (step ST2202).

In step ST2202, the determination target image analysis unit 122 performs the operation as described with reference to FIG. 15 in the first embodiment. However, in step ST2202, the determination target image analysis unit 122 outputs a forward-domain-converted image to the determination unit 14 in addition to the determination target image and the domain-converted image.

The determination unit 14 acquires the determination target image, the domain-converted image, and the forward-domain-converted image output from the determination target image analysis unit 122 in step ST2202, compares the acquired determination target image and the domain-converted image to perform the abnormality determination process (step ST2203).

In step ST2203, the determination unit 14 performs the abnormality determination process as described with reference to FIG. 16 in the first embodiment.

The determination unit 14 outputs the forward-domain-converted image acquired from the determination target image analysis unit 122 in step ST2202 to the abnormality analysis unit 16 together with the information regarding the determination result.

The abnormality analysis unit 16 performs the abnormality analysis process on the basis of the information regarding the determination result and the forward-domain-converted image output from the determination unit 14 in step ST2203 (step ST2204).

In the case of the "inspection mode," the control unit 10 provides an operation instruction to the abnormality analysis unit 16 after the abnormality determination process by the determination unit 14.

Figure 23:
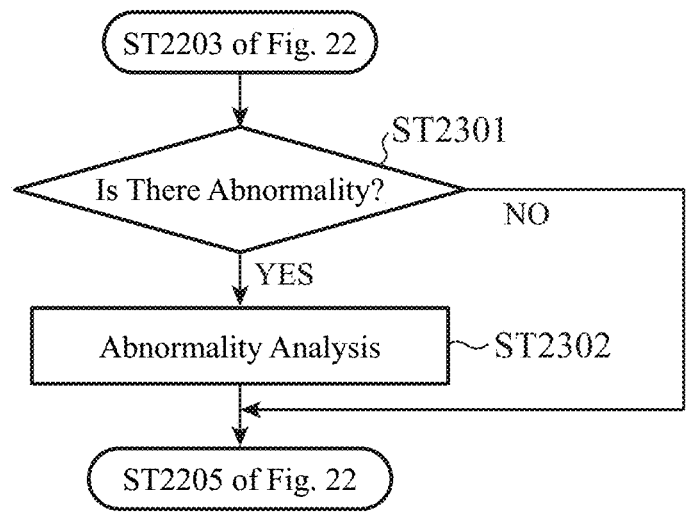
FIG. 23 is a flowchart for explaining details of an abnormality analysis process performed by the abnormality analysis unit in step ST2204 of FIG. 22 in the second embodiment.

Here, FIG. 23 is a flowchart for explaining details of an abnormality analysis process performed by the abnormality analysis unit 16 in step ST2204 of FIG. 22 in the second embodiment.

In step ST2203 of FIG. 22, the abnormality analysis unit 16 determines whether the determination unit 14 has output information regarding a determination result indicating that an abnormality is occurring in the target object 3 captured in the determination target image (step ST2301).

In step ST2301, if the abnormality analysis unit 16 determines that the determination unit 14 has output information regarding a determination result indicating that no abnormality is occurring in the target object 3 captured in the determination target image (in the case of "NO" in step ST2301), the abnormality analysis unit 16 terminates the process illustrated in FIG. 23 and proceeds to step ST2205 in FIG. 22. Note that, at this point, the abnormality analysis unit 16 outputs the information regarding the determination result output from the determination unit 14 to the input/output unit 15 as it is.

If it is determined in step ST2301 that the information regarding the determination result indicating that an abnormality is occurring in the target object 3 captured in the determination target image is output from the determination unit 14 (in the case of "YES" in step ST2301), the abnormality analysis unit 16 superimposes the bounding box and the forward-domain-converted image, and analyzes in which area in the determination target image the abnormality is occurring (step ST2302). Then, the abnormality analysis unit 16 outputs the information regarding the abnormality analysis result to the input/output unit 15 together with the information regarding the determination result output from the determination unit 14.

Let us refer back to the flowchart illustrated in FIG. 22.

The input/output unit 15 transmits the information regarding the determination result output from the abnormality analysis unit 16 in step ST2204 to the input/output device 4 (step ST2205).

In a case where the information regarding the abnormality analysis result is output from the abnormality analysis unit 16, the input/output unit 15 transmits the information related to the abnormality analysis result to the input/output device 4 together with the information regarding the determination result.

The input/output device 4 receives the information transmitted from the input/output unit 15 and displays the received information on, for example, a display.

For example in a case where the information regarding the abnormality analysis result is output from the input/output unit 15, the input/output device 4 causes the display to display the location where the abnormality is occurring in the target object 3, an error code, information of an handling manual, or the like on the basis of the information related to the abnormality analysis result.

As described above, according to the second embodiment, the abnormality inspection device 1a is capable of inspecting an abnormality of a target object without being affected by a difference in imaging conditions or a difference between images due to variations within a normal range as in the first embodiment.

Moreover, according to the second embodiment, the determination target image analysis unit 122 performs forward domain conversion on the determination target image acquired by the image acquiring unit 11 using a result of machine learning performed using the normal image as training data and outputs the obtained forward-domain-converted image to the determination unit 14, and the abnormality inspection device 1a further includes the abnormality analysis unit 16 for performing analysis on the abnormality using the forward-domain-converted image in a case where the determination unit 14 determines that an abnormality is occurring in the target object 3 captured in the determination target image acquired by the image acquiring unit 11. For this reason, in a case where it is determined that an abnormality is occurring in the determination target image, it is possible to provide information regarding the classification of or how to handle the abnormality in order to analyze the abnormality determined to have occurred using the forward-domain-converted image in a case where it is determined that the abnormality is occurring.

Note that in the abnormality inspection devices 1 and 1a of the first and second embodiments described above, in the "learning mode," the normal image analysis unit 121 performs machine learning using a normal image and causes the result of the machine learning to be stored, and then in the "inspection mode," the learning result acquiring unit 123 acquires the result of the machine learning stored by the normal image analysis unit 121, and the determination target image analysis unit 122 acquires a domain-converted image using the result of the machine learning.

However, without being limited thereto, it is only required that machine learning using a normal image is performed before the "inspection mode" is performed by the abnormality inspection device 1 or 1a. For example in a state in which machine learning is performed in advance and the result of the machine learning is stored, the abnormality inspection device 1 or 1a may not to include the normal image analysis unit 121, and the learning result acquiring unit 123 may acquire a result of machine learning that is stored in advance.

Note that the present invention may include a flexible combination of the respective embodiments, a modification of any component of the respective embodiments, or an omission of any component in the respective embodiments within the scope of the present invention.

INDUSTRIAL APPLICABILITY

An abnormality inspection device according to the present invention is capable of inspecting an abnormality of a target object without being affected by a difference in imaging conditions or a difference between images due to variations within a normal range, and thus is applicable to an abnormality inspection device for inspecting whether there is an abnormality in an object on the basis of an image capturing the object to be inspected.

REFERENCE SIGNS LIST 1, 1a: abnormality inspection device, 2: camera, 3: target object, 4: input/output device, 10: control unit, 11: image acquiring unit, 12: image analysis unit, 13: storage unit, 14: determination unit, 15: input/output unit, 16: abnormality analysis unit, 121: normal image analysis unit, 122: determination target image analysis unit, 123: learning result acquiring unit, 1101: processing circuit, 1102: HDD, 1103: input interface device, 1104: output interface device, 1105: CPU, 1106: memory.

The invention claimed is:

1. An abnormality inspection device comprising processing circuitry
    to acquire a determination target image in which a target object to be inspected is captured;
    to acquire a result of machine learning of forward domain conversion of an image or inverse domain conversion of an image performed using a normal image in which the target object in a normal state is captured as training data;
    to obtain a domain-converted image by sequentially performing forward domain conversion and inverse domain conversion on the determination target image, using the result of the machine learning;
    to determine whether or not an abnormality is occurring in the target object captured in the determination target image by comparing the determination target image and the domain-converted image;
    to obtain a forward-domain-converted image by performing forward domain conversion on the determination target image using a result of machine learning performed using the normal image as training data; and
    to perform analysis on the abnormality using the forward-domain-converted image when the abnormality is determined to be occurring in the target object captured in the determination target image.

2. The abnormality inspection device according to claim 1, wherein the processing circuitry further performs:
    to acquiring the normal image; and
    to perform the machine learning using the normal image.

3. The abnormality inspection device according to claim 1,
    wherein the forward domain conversion or the inverse domain conversion is performed using a neural network.

4. The abnormality inspection device according to claim 1,
    wherein the determination unit generates a difference image whose pixels indicate absolute values of differences between a plurality of pixels included in the determination target image and a plurality of pixels included in the domain-converted image, which positionally correspond to each other, and determines an area formed by a set of pixels having the absolute values greater than or equal to a threshold value among the pixels of the difference image as an area where an abnormality is occurring in the target object captured in the determination target image.

5. The abnormality inspection device according to claim 1, wherein the processing circuitry further performs:
    to output, to a display device, information regarding a determination result of whether or not the abnormality is occurring in the target object captured in the determination target image.

6. An abnormality inspection method comprising:
    acquiring a determination target image in which a target object to be inspected is captured;
    acquiring a result of machine learning of forward domain conversion of an image or inverse domain conversion of an image performed using a normal image in which the target object in a normal state is captured as training data;
    obtaining a domain-converted image by sequentially performing forward domain conversion and inverse domain conversion on the determination target image, using the result of the machine learning;
    determining whether or not an abnormality is occurring in the target object captured in the determination target image by comparing the determination target image and the domain-converted image;
    obtaining a forward-domain-converted image by performing forward domain conversion on the determination target image using a result of machine learning performed using the normal image as training data; and
    performing analysis on the abnormality using the forward-domain-converted image when the abnormality is determined to be occurring in the target object captured in the determination target image.

* * * * *